(12) United States Patent
Axmon et al.

(10) Patent No.: US 9,807,718 B2
(45) Date of Patent: Oct. 31, 2017

(54) SECONDARY CELL SYNCHRONIZATION FOR CARRIER AGGREGATION

(71) Applicant: Telefonaktiebolaget L M Ericsson (publ), Stockholm (SE)

(72) Inventors: Joakim Axmon, Kävlinge (SE); Dandan Hao, Beijing (CN); Peng Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 14/784,107

(22) PCT Filed: Sep. 25, 2013

(86) PCT No.: PCT/CN2013/084150
§ 371 (c)(1),
(2) Date: Oct. 13, 2015

(87) PCT Pub. No.: WO2014/169576
PCT Pub. Date: Oct. 23, 2014

(65) Prior Publication Data
US 2016/0073370 A1    Mar. 10, 2016

(30) Foreign Application Priority Data
Apr. 15, 2013  (WO) ............... PCT/CN2013/074187

(51) Int. Cl.
*H04W 56/00* (2009.01)
*H04L 5/00* (2006.01)
*H04W 24/10* (2009.01)

(52) U.S. Cl.
CPC ....... *H04W 56/0015* (2013.01); *H04L 5/0048* (2013.01); *H04L 5/0057* (2013.01); *H04W 24/10* (2013.01)

(58) Field of Classification Search
None
See application file for complete search history.

(56) References Cited

U.S. PATENT DOCUMENTS

2012/0269180 A1    10/2012   Li et al.
2012/0281680 A1*   11/2012   Bostrom ............ H04L 5/0051
                                                  370/336
(Continued)

FOREIGN PATENT DOCUMENTS

CN       102387508 A    3/2012
CN       103024890 A    4/2013
(Continued)

OTHER PUBLICATIONS

Ericsson, et al., "Analysis of SCell Activation Time in CA", 3GPP TSG RAN WG4 Meeting #64bis, Santa Rosa, US, Oct. 8, 2012, pp. 1-4, R4-125397, 3GPP.
(Continued)

*Primary Examiner* — Anh-Vu Ly
*Assistant Examiner* — Hector Reyes Ortiz
(74) *Attorney, Agent, or Firm* — Coats & Bennett, PLLC

(57) ABSTRACT

A carrier aggregation application method is provided of attaining time synchronization to a secondary cell for a wireless communication device usable in a cellular communication network. The method comprises, if a time reference of the secondary cell is unknown to the wireless communication device: setting a preliminary time reference of the secondary cell to equal a time reference of a primary cell of the carrier aggregation application; performing a synchronization signal based detection of the time reference of the secondary cell based on the preliminary time reference and one or more synchronization signals transmitted in the secondary cell; performing preliminary time reference based channel state measurements of the secondary cell based on the preliminary time reference and one or more reference signals transmitted in the secondary cell; setting, based on the synchronization signal based detection, a value of a channel quality indicator to either a nominal value or a value (Continued)

based on the preliminary time reference based channel state measurements; and transmitting a channel state information report comprising the channel quality indicator to the cellular communication network. An arrangement for a wireless communication device usable in a cellular communication network, adapted to attain time synchronization to a secondary cell of a carrier aggregation application is also disclosed. A modem comprising the arrangement and wireless communication device comprising the arrangement are also disclosed.

34 Claims, 10 Drawing Sheets

(56) References Cited

U.S. PATENT DOCUMENTS

| | | | |
|---|---|---|---|
| 2013/0028204 | A1 | 1/2013 | Dinan |
| 2014/0029586 | A1* | 1/2014 | Loehr .............. H04W 56/0005 370/336 |
| 2015/0341882 | A1* | 11/2015 | Davydov ............ H04W 72/042 370/336 |

FOREIGN PATENT DOCUMENTS

| | | |
|---|---|---|
| EP | 2432286 A1 | 3/2012 |
| EP | 2519050 A1 | 10/2012 |
| EP | 2775758 A1 | 9/2014 |
| WO | 2011124010 A1 | 10/2011 |
| WO | 2012138142 A2 | 10/2012 |
| WO | 2012154112 A1 | 11/2012 |
| WO | 2012167417 A1 | 12/2012 |
| WO | 2012167471 A1 | 12/2012 |
| WO | 2013005855 A1 | 1/2013 |
| WO | 2013025547 A2 | 2/2013 |
| WO | 2013040487 A1 | 3/2013 |

OTHER PUBLICATIONS

Ericsson, et al., "Interruption at Activation/Deactivation and Configuration/de-configuration of SCell", 3GPP TSG RAN WG4 Meeting #63, Prague, Czech Republic, May 21, 2012, pp. 1-2, R4-122647, 3GPP.

3rd Generation Partnership Project, "3rd Generation Partnership Project; Technical Specification Group Radio Access Network; Evolved Universal Terrestrial Radio Access (E-UTRA); Base Station (BS) radio transmission and reception (Release 11)", Technical Specification, 3GPP TS 36.104 V11.4.0, Mar. 1, 2013, pp. 1-134, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.5.0, Mar. 1, 2013, pp. 1-209, 3GPP.

3rd Generation Partnership Project, "LTE; Evolved Universal Terrestrial Radio Access (E-UTRA); Requirements for support of radio resource management", 3GPP TS 36.133 V. 11.4.0, Release 11, Clause 8: UE Measurements Procedures in RRC_CONNECTED State, Apr. 1, 2013, pp. 57-124, ETSI TS 136 133 V 11.4.0, ETSI.

3rd Generation Partnership Project, "3rd Generation Partnership Project; Technical Specification Group Radio Access Network; Evolved Universal Terrestrial Radio Access (E-UTRA); Physical Channels and Modulation (Release 11)", Technical Specification, 3GPP TS 36.211 V11.2.0, Feb. 1, 2013, pp. 1-109, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 10)", Technical Specification, 3GPP TS 36.213 V10.9.0, Feb. 1, 2013, pp. 1-126, 3GPP, France.

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 10)", Technical Specification, 3GPP TS 36.321 V10.8.0, Mar. 1, 2013, pp. 1-54, 3GPP, France.

3rd Generation Partnership Project, "3rd Generation Partnership Project; Technical Specification Group Radio Access Network; Evolved Universal Terrestrial Radio Access (E-UTRA); User Equipment (UE) radio transmission and reception (Release 8)", Technical Specification, 3GPP TS 36.101 V8.21.0, Mar. 1, 2013, pp. 1-184, 3GPP, France.

* cited by examiner

SECONDARY CELL SYNCHRONIZATION FOR CARRIER AGGREGATION

TECHNICAL FIELD

The present invention relates generally to the field of carrier aggregation techniques. More particularly, it relates to secondary cell activation in carrier aggregation scenarios.

BACKGROUND

Throughout this disclosure, notations and examples based on the Universal Mobile Telecommunication Standard, Long Term Evolution (UMTS-LTE, also termed Evolved UMTS Terrestrial Radio Access Network—E-UTRAN—and advocated by the Third Generation Partnership Program—3GPP) will be used. It should be noted, however, that this is not meant as being limiting. Contrarily, embodiments and application scenarios may be equally applicable in relation to other known or future communication standards. DL denotes downlink and UL denotes uplink.

Carrier Aggregation

Carrier aggregation was introduced in Release 10 of the E-UTRAN standard for E-UTRAN to be able to meet the 1000 Mbit/s requirement of 4G. Another purpose of carrier aggregation is to allow operators with small (e.g. less than 20 MHz) and scattered spectrum allocations to provide a good user experience by aggregating the scattered allocations into e.g. 10 MHz, 20 MHz, or more.

In a typical carrier aggregation example, the User Equipment (UE) is connected to a serving cell, which is termed the Primary Cell (PCell) using a carrier referred to as the Primary Component Carrier (PCC). Mobility is catered for on the Primary Component Carrier. If the UE is using services that require high throughput, the network may activate one or more additional serving cells, each termed Secondary Cell (SCell), using respective carrier(s) referred to as Secondary Component Carrier(s) (SCC). The Secondary Cell activation may happen before or after the SCell has been detected by the UE. For example, SCell activation before SCell detection may be based on knowledge by the network regarding the position (location) of the UE. For example, the network may be aware that the UE is located in a coverage area of a potential SCell. Examples of such an approach to SCell activation are disclosed in WO/2012/154112.

Two types of carrier aggregation scenarios are considered for Release 10:

Intra-band contiguous aggregation.
Inter-band aggregation.
In Release 11, one additional type is considered:
Intra-band non-contiguous aggregation.

In intra-band contiguous aggregation, the PCell and SCell(s) are contiguous in frequency. It is required by the standard that (for intra-band contiguous aggregation) the time (or equivalently, timing) difference between PCell and SCell is at most ±130 ns (3GPP TS 36.104 rev 11.4.0, subclause 6.5.3). It is further assumed in the standard that, for this particular scenario (intra-band contiguous aggregation), one can use a single fast Fourier transform (FFT) to simultaneously demodulate the signals received from PCell and SCell. Thus, in practice it is typically required that the PCell and SCell are co-located, i.e., transmitted from the same (geographical) site, since otherwise the difference in propagation delays between PCell and SCell would make it impossible to use a single FFT.

For intra-band non-contiguous aggregation the timing difference is allowed to be at most ±260 ns, and no assumption is made regarding the cells being co-located or regarding that it should be possible to use a single FFT.

For inter-band carrier aggregation the timing difference between the PCell and SCell is allowed to be at most ±1.3 μs. For this scenario it is further assumed that the cells may be non-co-located and that the UE should be able to cope with a propagation delay difference between PCell and SCell of up to ±30 μs, resulting in a maximum delay spread of ±31.3 μs (3GPP TS 36.300 rev 11.5.0 Annex J).

Examples of foreseen deployment scenarios are shown in FIG. 1 (see also 3GPP TS 36.300 rev 11.5.0 Annex J). Solid lines illustrate PCell on a carrier frequency F1 and dashed lines illustrate SCell on a carrier frequency F2.

Part (a) of FIG. 1 illustrates a co-located overlaid intra-band scenario, a scenario with fully overlapping coverage of PCell and SCell. Three base station sites 101a, 102a, 103a are illustrated, each providing three PCells (as illustrated by 121:1a, 121:2a, 121:3a for the site 101a) and three SCells (as illustrated by 131:1a, 131:2a, 131:3a for the site 101a). Since the different carrier frequencies of PCell and SCell are in the same frequency band, the path losses experienced in PCell and SCell respectively are comparable and, hence, the coverage area of PCell and SCell are similar.

Part (b) of FIG. 1 illustrates a co-located overlaid inter-band scenario. Three base station sites 101b, 102b, 103b are illustrated, each providing three PCells (as illustrated by 121:1b, 121:2b, 121:3b for the site 101b) and three SCells (as illustrated by 131:1b, 131:2b, 131:3b for the site 101b). Since the different carrier frequencies of PCell and SCell are not in the same frequency band, the difference between path losses experienced in PCell and SCell respectively is large and, hence, the coverage area of PCell and SCell are different.

Part (c) of FIG. 1 illustrates a co-located, partially overlaid, inter-band scenario. Three base station sites 101c, 102c, 103c are illustrated, each providing three PCells (as illustrated by 121:1c, 121:2c, 121:3c for the site 101c) and three SCells (as illustrated by 131:1c, 131:2c, 131:3c for the site 101c). The coverage area of PCell and SCell are different.

Part (d) of FIG. 1 illustrates a non-co-located inter-band scenario. Three base station sites 101d, 102d, 103d are illustrated, each providing three PCells (as illustrated by 121:1d, 121:2d, 121:3d for the site 101d). Further, there are remote radio heads (e.g. 111:1d, 111:2d) each providing a PCell (as illustrated by 131:1d for 111:1d and by 131:2d for 111:2d) to provide improved throughput at hotspots. The coverage area of PCell and SCell are different.

Part (e) of FIG. 1 illustrates a co-located overlaid inter-band scenario with repeaters. Similarly to part (b), three base station sites 101e, 102e, 103e are illustrated, each providing three PCells (as illustrated by 121:1c, 121:2c, 121:3c for the site 101c) and three SCells (as illustrated by 131:1c, 131:2c, 131:3c for the site 101c), wherein the coverage area of PCell and SCell are different. Further, there are repeaters (e.g. 111:2d) each providing a PCell (as illustrated by 141:2d for 111:2d) to provide improved throughput at hotspots.

For co-located intra-band scenario with fully overlapping coverage area of PCell and SCell (see FIG. 1, part (a)), the eNB (enhances NodeB) can configure and activate the SCell when needed, based on reported measurements for PCell alone.

More generally, the timing of the SCell is priorly known if the UE has measured and reported that cell recently (the exact time frame, i.e. the definition of recently, is currently (2013) under discussion in standardization work), either as an inter-frequency neighboring cell or as a cell on a configured secondary component carrier (F2). The timing of the SCell is also considered priorly known, regardless of whether or not it has been reported recently, for intra-band contiguous carrier aggregation, i.e., where the spectrums of PCell and SCell are contiguous ("back-to-back"). When the UE gets an activation command for the SCell under any of those conditions, the UE may be able to start reception from the SCell without first performing fine-tuning of the timing.

If the cell corresponding to SCell has not been reported recently and is either on another band (inter-band aggregation scenario) or intra-band non-adjacent, the timing of the SCell is not known to the UE. However, as mentioned above it is known that it shall fall within ±31.3 µs (almost half an OFDM—orthogonal frequency division multiplex—symbol) relative to the PCell. In this case, the timing of the SCell will have to be tuned before the UE can start reception from the SCell.

Various techniques for SCell synchronization are known. For example, WO2013/025547A2 discloses some situations where the PCell timing may be used as initial time synchronization for SCell.

Cell Detection and Measurements

Connected mode mobility within E-UTRA is supported by measurements that are carried out and reported to the network by the UE. The network uses the measurement reports when deciding whether or not to hand over the UE to another eNB. The network may typically also use the measurement reports for other purposes such as e.g. network optimization and cell planning.

The measurements carried out by the UE typically include detection of neighboring cells (e.g. cell search) and estimation of signal strength (e.g. Reference Signal Received Power—RSRP—and/or Reference Signal Received Quality—RSRQ). The requirements in 3GPP TS 36.133 rev 11.4.0 subclause 8 stipulates that the UE shall be able to detect intra-frequency neighboring cells that are as weak as $\hat{E}_s/I_{ot}=-6$ dB (frequency-domain Signal-to-Interference-and-Noise Ratio—SINR) and report them to the network within a given time. For carrier aggregation, both PCC and SCC are considered as intra-frequency carriers and the corresponding cells are considered as intra-frequency neighboring cells, which should be detected and reported correspondingly.

Cell search in E-UTRA comprises acquisition of: frequency and symbol synchronization, frame synchronization, and physical cell identity. It is facilitated by two signals that are transmitted on a 5 ms basis (repeated every 5 ms) in each cell: the primary synchronization signal (P-SSIG or PSS) and the secondary synchronization signal (S-SSIG or SSS). These signals are described in 3GPP TS 36.211 rev 11.2.0 subclause 6.11, and illustrated in FIG. 2 for an LTE FDD (frequency division duplex) radio frame. Further details around the central 72 subcarriers are highlighted in FIG. 3 for LTE FDD (frequency division duplex) and in FIG. 4 for LTE TDD (time division duplex). The illustrations in FIGS. 2, 3, and 4 are schematic and hence not meant to be in exact scale or correct with regard to mutual sizes of items.

FIG. 2 illustrates an example time-frequency layout of an LTE FDD radio frame. Time is illustrated in the horizontal axis (subdivided into subframes 0, 1, 2, . . . , 9 as illustrated by 150, 151, 152, 153) and frequency is illustrated on the vertical axis. The black boxes illustrate Cell-specific Reference Signals (CRS) that are always present and the white boxes illustrate Cell-specific Reference Signals (CRS) that are present sometimes. The central 72 subcarriers are illustrated by 154, and a part of thereof is enhanced at 158 for clarity. The transmission of SSS is shown at 155, the transmission of PSS is shown at 156, and the transmission of the Physical Broadcast CHannel (PBCH) is shown at 157.

FIG. 3 illustrates example synchronization signals and reference symbols transmitted in an FDD cell (compare with FIG. 2). Only the central 72 sub-carriers are shown. Time is illustrated in the horizontal axis (subdivided into subframes 0, 1, 2, . . . , 9 as illustrated by 160, 161, 162, 163) and frequency is illustrated on the vertical axis (subdivided into resource blocks 0, . . . , 5 as illustrated by 164, 165). The black boxes illustrate CRS for down-link transmission (DLTX0, from antenna port 0 of the base station) that are always present and the white boxes illustrate CRS for DLTX0 that are present sometimes. The transmission of SSS and PSS (transmitted on the Secondary Synchronization CHannel—S-SCH and Primary Synchronization CHannel—P-SCH, respectively) are shown in the same positions as in FIG. 2. Some sub-frames (illustrated by 166 and 167) may be used for e.g. MBSFN (Multicast Broadcast Single Frequency Network). Therefore, they might not contain cell-specific reference symbols.

FIG. 4 illustrates example synchronization signals and reference symbols transmitted in a TDD cell. Only the central 72 sub-carriers are shown. Time is illustrated in the horizontal axis (subdivided into subframes 0, 1, 2, . . . , 9 as illustrated by 170, 171, 172, 173) and frequency is illustrated on the vertical axis (subdivided into resource blocks 0, . . . , 5 as illustrated by 174, 175). The black boxes illustrate CRS for DLTX0 that are always present and the white boxes illustrate CRS for DLTX0 that are present sometimes. The transmission of SSS and PSS (transmitted on the Secondary Synchronization CHannel—S-SCH 178 and Primary Synchronization CHannel—P-SCH 179, respectively) are also shown. It may be noted that the positions of the synchronization channels differ slightly from the FDD case. Some sub-frames (illustrated by 176 and 177) may be used for e.g. guard period (GP) purposes, uplink (UL) or MBSFN. Therefore, they might not contain cell-specific reference symbols.

As described in the standard, the P-SSIG exists in three versions (one for each out of three cell-within-group identities), based on Zadoff-Chu sequences that are mapped onto the central 62 resource elements (REs) (only 62 out of the 72 central REs may be used and the 5 REs closest to each edge set to zero according to a typical approach). There are 168 cell groups in total, and information regarding which cell group a cell belongs to is carried by the S-SSIG, which is based on m-sequences. The cell group and the P-SSIG version together yield the physical cell identity, of which there are 3×168=504. S-SSIG also carries information regarding whether the particular instance of S-SSIG is transmitted in subframe 0 or subframe 5, which is used for acquiring frame timing (frame synchronization). Furthermore, the S-SSIG is scrambled with the cell-within-group identity of the particular cell. Hence, there are 2×3×168=2× 504 versions in total, two for each of the 504 physical cell identities. Similarly to P-SSIG, S-SSIG is mapped onto the central 62 REs.

Detection of a cell may, as is well-known in the art, be based on matched filtering of received samples (based on the three P-SSIG versions) over at least 5 ms. Correlation peaks in the matched filter output typically reveal synchronization signals from one or more cells. This procedure is referred to as symbol synchronization. Having established symbol synchronization and identified the cell-within-group identity, S-SSIG detection is typically carried out yielding frame timing (frame synchronization), physical cell identity (via determination of the cell group identity), and cyclic prefix (CP) configuration.

Requirements of SCell Activation

A typical example requirement on the maximum acceptable delay (latency) for SCell activation (from reception of the activation command until valid channel state information (CSI) is transmitted to the network) may comprise that, for SINR>−3 dB, activation shall be completed within 24 ms if the cell is known (typically defined as e.g. RSRP measurements having been reported to the network within the last period of a length equal to the minimum of 5 DRX cycles and 5 SCell measurement cycles), and 34 ms if the cell is unknown, often referred to as blind activation (typically defined as e.g. RSRP measurements not having been reported within the period above).

According to the standard, the UE shall start transmitting CSI already 8 ms after having received the SCell activation command. However, before synchronization to the SCell has been achieved, the CSI shall indicate out-of-range (Channel Quality Indicator, CQI=0).

The example requirement shall typically be met for a worst case scenario regarding the available number of unicast subframes. For LTE FDD the worst case scenario is when there are 2 unicast subframes per 5 ms. For LTE TDD the worst case scenario is when there is only one unicast subframe and one special subframe per 5 ms.

It may be challenging to meet a typical blind SCell activation requirement if typical, known cell detection approaches (e.g. the ones disclosed in WO2013/025547A2) are used. Therefore, there is a need for methods and arrangements that can achieve CSI reporting as required. For example, there is a need for methods and arrangements that can meet the latency requirements of CSI reporting during SCell activation in carrier aggregation scenarios

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide methods and arrangements for attaining time synchronization to a secondary cell in carrier aggregation scenarios. Preferably, the provided methods and arrangements thereby can achieve CSI reporting as required.

According to a first aspect, a carrier aggregation application method is provided of attaining time synchronization to a secondary cell for a wireless communication device usable in a cellular communication network. The method comprises, if a time reference of the secondary cell is unknown to the wireless communication device:

setting a preliminary time reference of the secondary cell to equal a time reference of a primary cell of the carrier aggregation application;

performing a synchronization signal based detection of the time reference of the secondary cell based on the preliminary time reference and one or more synchronization signals transmitted in the secondary cell;

performing preliminary time reference based channel state measurements of the secondary cell based on the preliminary time reference and one or more reference signals transmitted in the secondary cell;

setting, based on the synchronization signal based detection, a value of a channel quality indicator to either a nominal value or a value based on the preliminary time reference based channel state measurements; and transmitting a channel state information report comprising the channel quality indicator to the cellular communication network.

The nominal value may, for example, be equal to zero. The transmission of the channel quality indictor to the cellular communication network may, for example, comprise transmission of the channel quality indictor to the primary cell. The reference signals may be denoted channel state measurement reference signals.

The execution of the step of performing preliminary time reference based channel state measurements of the secondary cell may overlap the execution of the step of performing a synchronization signal based detection of the time reference of the secondary cell. Hence, the preliminary time reference based channel state measurements of the secondary cell may be based on the time reference of the primary cell, which typically shortens the average time to secondary cell activation since an acceptable channel quality indicator value may be achieved before synchronization to the secondary cell has been acquired.

In some embodiments, performing the synchronization signal based detection of the time reference of the secondary cell based on the preliminary time reference and one or more synchronization signals transmitted in the secondary cell and performing preliminary time reference based channel state measurements of the secondary cell based on the preliminary time reference and one or more reference signals transmitted in the secondary cell may be performed in parallel.

Setting the value of the channel quality indicator may, according to some embodiments, comprise setting the value of the channel quality indicator to the nominal value if the synchronization signal based detection indicates that the secondary cell is not detected.

Setting the value of the channel quality indicator may, according to some embodiments, further comprise, if the synchronization signal based detection indicates that the secondary cell is detected: determining a synchronization signal based time deviation between the preliminary time reference and the time reference of the synchronization signal based detection, and if an absolute value of the synchronization signal based time deviation is greater than a synchronization signal based time deviation threshold, adjusting the time reference of the secondary cell based on the synchronization signal based time deviation and setting the value of the channel quality indicator to the nominal value.

If the absolute value of the synchronization signal based time deviation is less than the synchronization signal based time deviation threshold, the method may (in some embodiments) further comprise: adjusting the time reference of the secondary cell based on the synchronization signal based time deviation, and setting the value of the channel quality indicator to the value based on the preliminary time reference based channel state measurements.

According to some embodiments, the method may further comprise performing a common reference signal based detection of the time reference of the secondary cell based on the preliminary time reference and one or more common reference signals transmitted in the secondary cell, and setting the value of the channel quality indicator to either the nominal value or the value based on the preliminary time reference based channel state measurements may be further based on the common reference signal based detection. The common reference signals may be denoted time reference detection reference signals and may be the same as or different from the channel state measurement reference signals.

If the absolute value of the synchronization signal based time deviation is less than the synchronization signal based time deviation threshold, the method may (in some embodiments) further comprise: determining a common reference signal based time deviation between the preliminary time reference and the time reference of the common reference signal based detection, and if an absolute value of the common reference signal based time deviation is greater than a common reference signal based time deviation threshold, adjusting the time reference of the secondary cell based on the common reference signal based time deviation and setting the value of the channel quality indicator to the nominal value.

According to some embodiments, if the absolute value of the common reference signal based time deviation is less than the common reference signal based time deviation threshold, the method may comprise adjusting the time reference of the secondary cell based on the common reference signal based time deviation and setting the value of the channel quality indicator to the value based on the preliminary time reference based channel state measurements.

Alternatively or additionally to the embodiments comprising the common reference signal based detection, if the absolute value of the synchronization signal based time deviation is less than the synchronization signal based time deviation threshold and greater than a synchronization signal based time deviation acceptance threshold the method may (in some embodiments) comprise: determining a common reference signal based time deviation between the preliminary time reference and the time reference of the common reference signal based detection, and if an absolute value of the common reference signal based time deviation is greater than a common reference signal based time deviation threshold, adjusting the time reference of the secondary cell based on the common reference signal based time deviation and setting the value of the channel quality indicator to the nominal value. If the absolute value of the synchronization signal based time deviation is less than the synchronization signal based time deviation threshold and less than the synchronization signal based time deviation acceptance threshold, the method may (in some embodiments) comprise adjusting the time reference of the secondary cell based on the synchronization signal based time deviation or the common reference signal based time deviation and setting the value of the channel quality indicator to the value based on the preliminary time reference based channel state measurements.

Performing the common reference signal based detection of the time reference of the secondary cell based on the preliminary time reference and one or more common reference signals transmitted in the secondary cell may, according to some embodiments, be performed in parallel to performing the synchronization signal based detection of the time reference of the secondary cell based on the preliminary time reference and one or more synchronization signals transmitted in the secondary cell.

The method may, in some embodiments, further comprise, if the time reference of the secondary cell is known to the wireless communication device:
 performing known time reference based channel state measurements of the secondary cell based on the known time reference and one or more reference signals transmitted in the secondary cell;
 setting the value of the channel quality indicator to either a nominal value or the value based on the known time reference based channel state measurements; and
 transmitting the channel state information report comprising the channel quality indicator to the cellular communication network.

In some embodiments, the method may further comprise initially receiving a secondary cell activation request from the primary cell.

Setting the value of the channel quality indicator may, in some embodiments, further comprise, if the synchronization signal based detection indicates that the secondary cell is detected:
 determining a synchronization signal based time deviation between the preliminary time reference and the time reference of the synchronization signal based detection;
 determining a common reference signal based time deviation between the preliminary time reference and the time reference of the common reference signal based detection;
 determining a difference between the synchronization signal based time deviation and the common reference signal based time deviation;
 if an absolute value of the difference is less than a difference threshold, adjusting the time reference of the secondary cell based on at least one of the synchronization signal based time deviation and the common reference signal based time deviation, and setting the value of the channel quality indicator to the value based on the preliminary time reference based channel state measurements; and
 if the absolute value of the difference is greater than the difference threshold, setting the value of the channel quality indicator to the nominal value.

Performing the synchronization signal based detection of the time reference of the secondary cell may comprise creating a power delay profile based on two or more orthogonal frequency division multiplex—OFDM—symbols of the synchronization signals according to some embodiments.

The respective carrier frequency of the primary and secondary cells may, for example, be non-contiguous and located in a same frequency band (i.e. intra-band carrier aggregation), or located in different frequency bands (i.e. inter-band carrier aggregation). The approaches of some embodiments may also be used when respective carrier frequency of the primary and secondary cells are contiguous and located in a same frequency band (i.e. intra-band carrier aggregation). In the latter case, it is typically assumed that the time reference of the second cell is known to the wireless communication device.

According to some embodiments, the wireless communication device and the cellular communication network may be compliant with the Universal Mobile Telecommunication Standard, Long Term Evolution—UMTS-LTE. In such embodiments, the one or more synchronization signals may, for example, be a primary synchronization signal (P-SSIG) and/or a secondary synchronization signal (S-SSIG). The reference signals may, for example, comprise reference symbols such as common reference symbols.

In some embodiments, performing a synchronization signal based detection of the time reference of the secondary cell based on the preliminary time reference and one or more synchronization signals transmitted in the secondary cell may comprise:

performing a fast Fourier transform of the one or more synchronization signals transmitted in the secondary cell based on the preliminary time reference to produce a transformed signal;

extracting a relevant part of the transformed signal;

appending zero-valued signal elements to the extracted part to produce a zero-padded transformed signal part;

performing an inverse fast Fourier transform of the zero-padded transformed signal part to produce a reconstructed signal;

performing one or more fast Fourier transforms of the reconstructed signal based on one or more respective alternative time references to produce respective one or more transformed signal alternatives;

creating a power delay profile based on the reconstructed signal and the one or more transformed signal alternatives; and detecting the time reference of the secondary cell based on the created power delay profile.

A second aspect is a computer program product comprising a computer readable medium, having thereon a computer program comprising program instructions, the computer program being loadable into a data-processing unit and adapted to cause the data-processing unit to execute method steps according to the first aspect when the computer program is run by the data-processing unit.

A third aspect is an arrangement for a wireless communication device usable in a cellular communication network, adapted to attain time synchronization to a secondary cell of a carrier aggregation application. The arrangement comprises a transmitter, a receiver and a signal processor circuit.

The receiver is adapted to receive one or more synchronization signals transmitted in the secondary cell and one or more reference signals transmitted in the secondary cell.

The signal processor circuit is adapted to, if a time reference of the secondary cell is unknown to the wireless communication device:

set a preliminary time reference of the secondary cell to equal a time reference of a primary cell of the carrier aggregation application;

perform a synchronization signal based detection of the time reference of the secondary cell based on the preliminary time reference and one or more synchronization signals transmitted in the secondary cell;

perform preliminary time reference based channel state measurements of the secondary cell based on the preliminary time reference and one or more reference signals transmitted in the secondary cell; and set, based on the synchronization signal based detection, a value of a channel quality indicator to either a nominal value or a value based on the preliminary time reference based channel state measurements.

The transmitter is adapted to transmit a channel state information report comprising the channel quality indicator to the cellular communication network.

A fourth aspect is a modem comprising the arrangement of the third aspect. A fifth aspect is a wireless communication device comprising the arrangement of the third aspect or the modem of the fourth aspect. The wireless communication device of the fifth aspect and/or the modem of the fourth aspect may be compliant with the Universal Mobile Telecommunication Standard, Long Term Evolution—UMTS-LTE.

In some embodiments, the third, fourth and fifth aspects may additionally have features identical with or corresponding to any of the various features as explained above for the first aspect. For example, the signal processor circuit of the third aspect may be further adapted to perform one or more of the method steps of the first aspect.

It should be noted that when two actions have been disclosed above to take place when a metric is greater than or less than a threshold respectively, the case when the metric is equal to the threshold may be included in either of the two cases as applicable in the scenario at hand.

Further, it should also be noted that when an action, determination, or similar has been disclosed above to be based on signal, metric, parameter, or similar, this is meant to include any known or future implementation (e.g., the examples given herein). For example, adjusting the time reference based on a determined time deviation may comprise adding or subtracting—depending on the sign of the determined time deviation—the absolute value of the determined time deviation to/from the time reference.

That actions are performed in parallel is meant to include the case when the actions are performed simultaneously (or at least initiated simultaneously).

One advantage of some embodiments, is that some of the presented approaches allow the SCell to generally be activated earlier than if regular cell search had been used. This is due to that, as soon as the UE has synchronized to the SCell, it has already prepared the CSI report (based on the PCell timing) and is ready to start reception. In a prior art system, the UE should have had to measure and prepare the CSI report (based on the PCell timing) only after the UE has synchronized to the SCell, which adds to the latency of SCell activation.

Thus, an improved possibility to meet the latency requirements of CSI reporting during SCell activation (especially for blind activation) in carrier aggregation scenarios is provided. The approaches according to some embodiments allow the current requirements in the Third Generation Partnership Project (3GPP) standard specification to be met (e.g. the test case cold-start 1, start-up where prior parameter knowledge may be limited, in the channel models ETU-70 (Extended Typical Urban with a maximum Doppler shift of 70 Hz) and EPA-5 (Extended Pedestrian A with a maximum Doppler shift of 5 Hz)). Even if the standard requirements would be relaxed, operators (and users) would still benefit from the quick activation.

Another advantage of some embodiments, is that the same or similar approaches can be used for all kinds of SCell activation, so there is no need to distinguish between different cases (e.g. inter-band, intra-band contiguous and intra-band non-contiguous scenarios) and/or to involve different procedures depending on the applicable scenario. This simplifies implementation and maintenance.

Yet another advantage of some embodiments is that the example involving "interpolation" of OFDM symbols (example SS-PDP generation, see e.g. FIGS. 9 and 10) enables an implementation without extra requirements, e.g. a faster FFT hardware accelerator.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
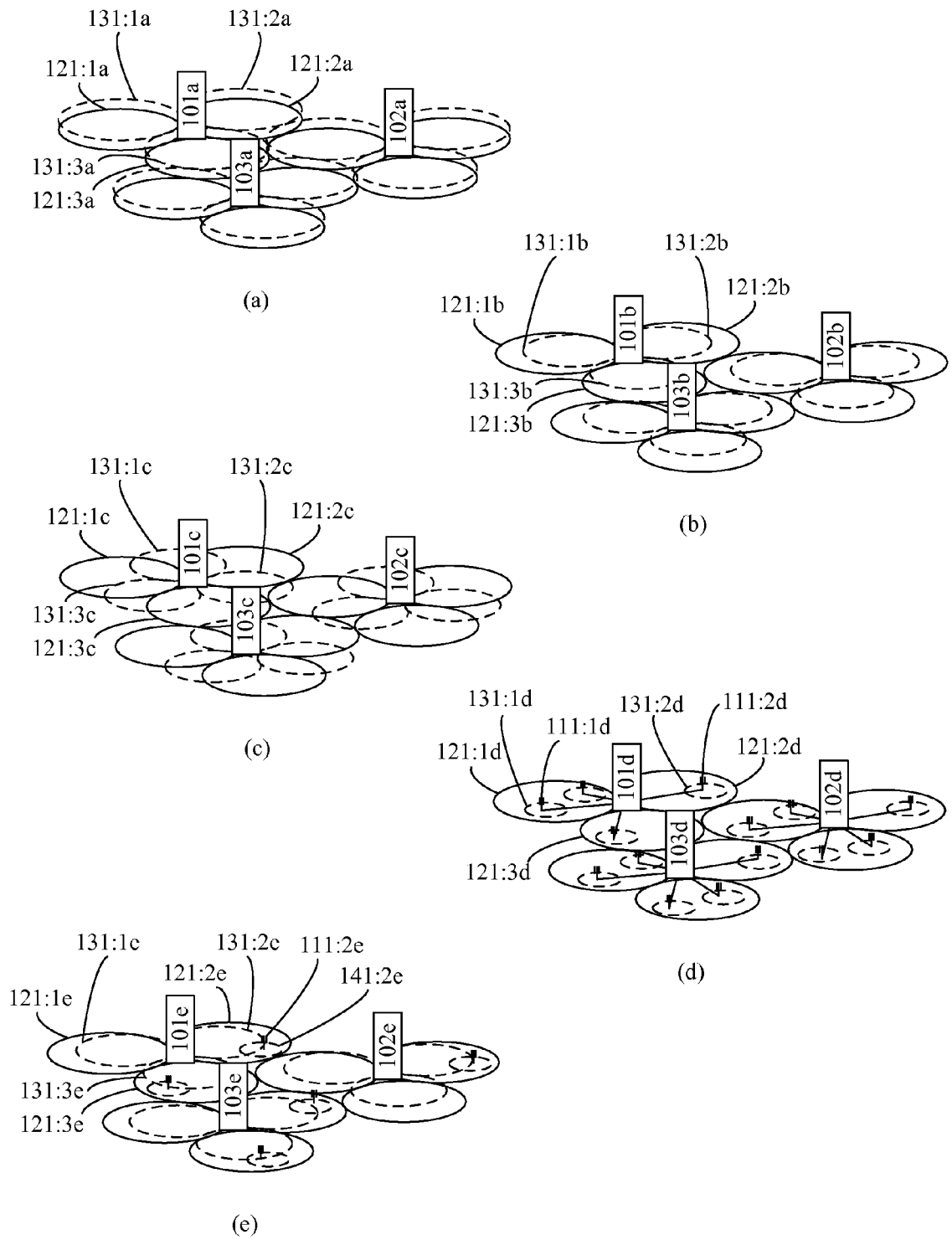
FIG. 1 is a schematic drawing illustrating example carrier aggregation deployment scenarios.
Figure 2:
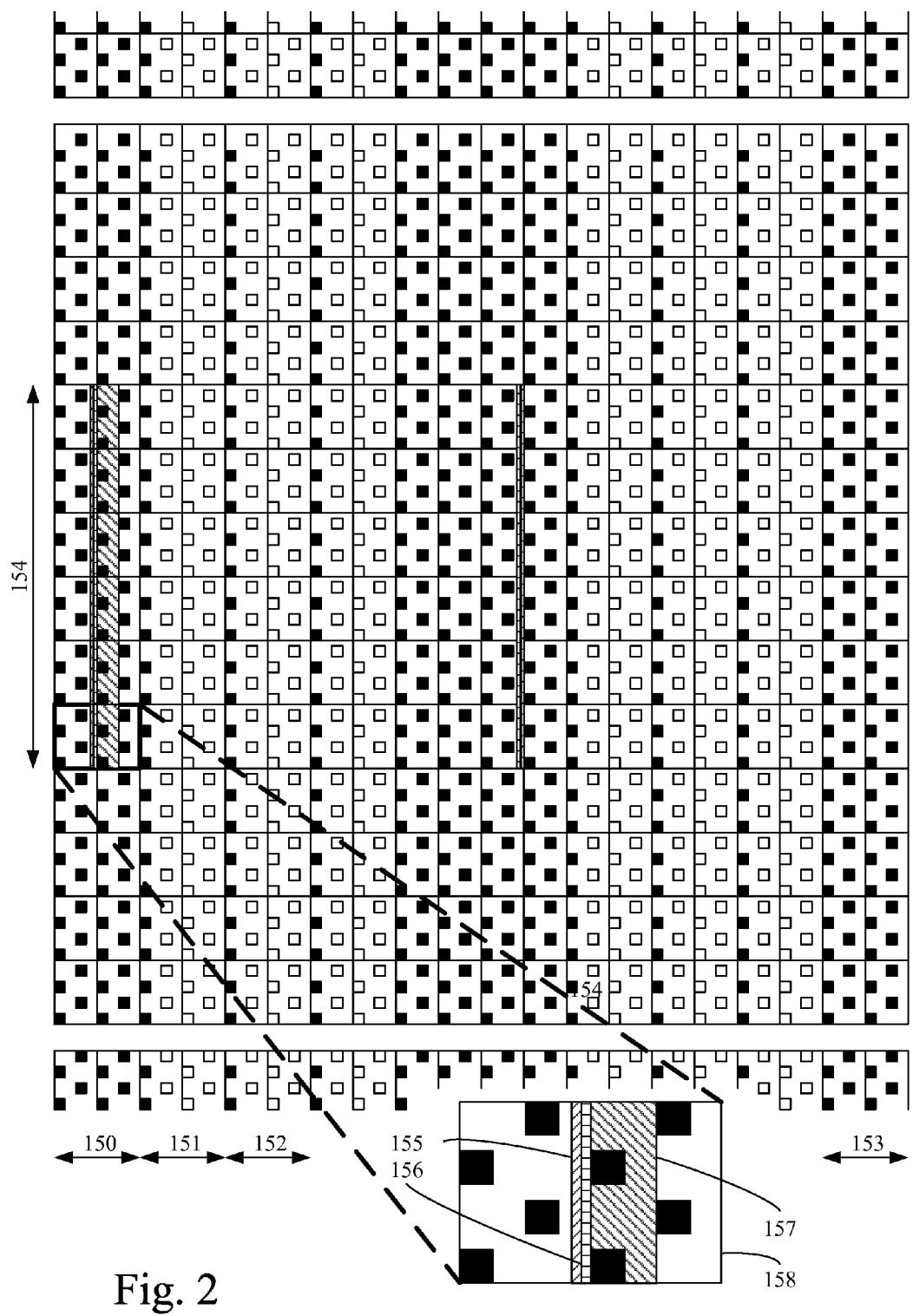
FIG. 2 is a schematic drawing illustrating an example time-frequency layout of an LTE FDD radio frame.
Figure 3:
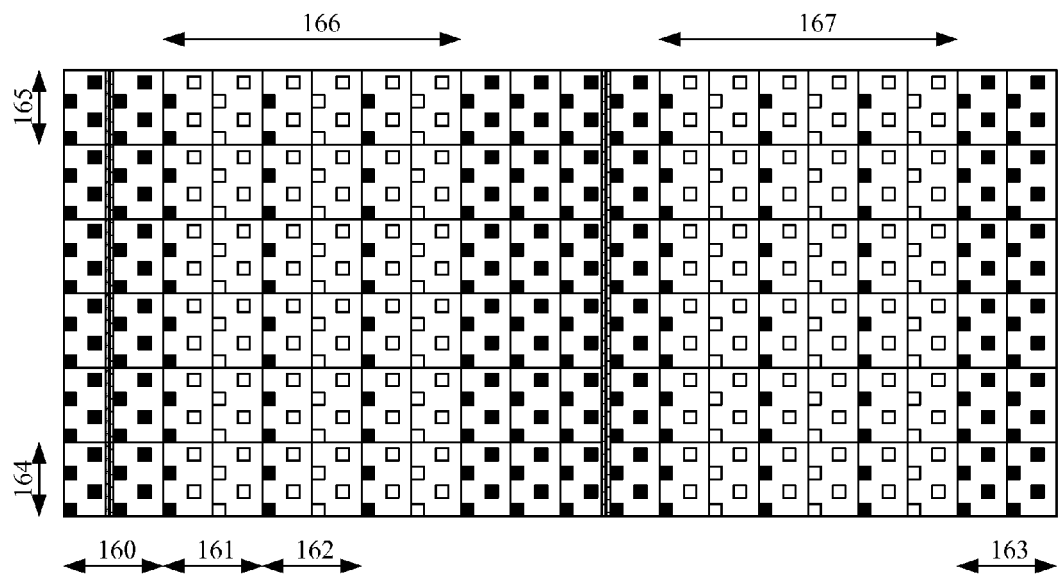
FIG. 3 is a schematic drawing illustrating example synchronization signals and reference symbols transmitted in an LTE FDD cell.
Figure 4:
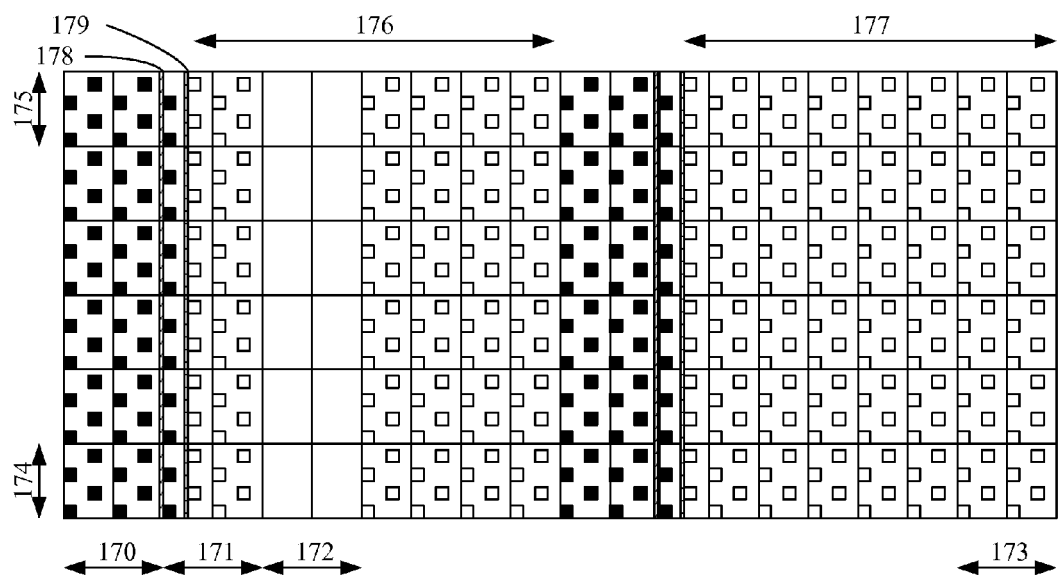
FIG. 4 is a schematic drawing illustrating example synchronization signals and reference symbols transmitted in an LTE TDD cell.

In the following, some embodiments will be described. These embodiments are merely intended as illustrative examples and are by no means limiting.

As will be exemplified in the following (e.g. in connection to FIG. 12), some embodiments concern an approach for carrier aggregation scenarios where an object is to achieve a quick synchronization of a user equipment (UE) to an unknown SCell, and to issue a CSI report within the required activation time. According to some of these embodiments, several activities (e.g. two or more of synchronization to cell, channel estimation, and measurements for CSI report) may be scheduled simultaneously. Therefore, as soon as sufficient synchronization is achieved, a valid CSI report (based on the simultaneously performed measurements) can be directly sent from the UE to the network whereby the UE can quickly get scheduled on the SCell.

The synchronization to an unknown SCell may, according to some embodiments, be based on substituting SCell timing with PCell timing, and then detecting the residual timing (±31.3 µs as discussed above) using an estimator, implemented in the UE, that has a capture range of ±½ OFDM symbol (±33.3 µs). A figure of merit produced by the estimator may indicate whether or not synchronization has been achieved.

Another estimator may be used in addition to the aforementioned estimator. This may provide estimates of higher accuracy while having a smaller capture range (e.g. ±5.5 µs). The accuracy of the other estimator improves with increasing bandwidth. Similarly to the aforementioned estimator, a figure of merit produced by the other estimator may indicate whether or not synchronization has been achieved.

Some embodiments apply the following principle of operation of the UE based on the result of the estimator(s):

If synchronization has been achieved and the detected residual timing is small (e.g. below a threshold), a CSI report containing a valid CQI value can be issued immediately.

If synchronization has been achieved and the detected residual timing is large (e.g. above a threshold, which may or may not coincide with the threshold above), the timing is adjusted before a valid CQI is calculated (typically based on new measurements) and issued. In the meantime CQI=0 (out of range) is reported to the network.

If synchronization has not been achieved, a new attempt is made in the next suitable subframe.

Moreover, some embodiments include particular details on how the estimator performance can be improved by interpolating synchronization signal information between OFDM symbols without increasing the rate at which the FFT hardware accelerator works.

For synchronizing to an SCell, two or more the following components and/or actions may typically be used:
  Gain Search
  Residual time detector based on synchronization signals (SS), e.g. the coarse estimator described above
  Residual time detector based on common reference signals (CRS)), e.g. the fine estimator described above
  CSI measurements
  Example implementations for each of them are described below.

Gain Search

Gain search is typically used to find the initial gain level for Automatic Gain Control (AGC) so that received IQ samples can be properly scaled to prevent loss of information when the samples are represented in finite bit width. Gain search may take up to almost a full subframe. Typically, it has to be carried out in unicast subframes or parts thereof in order to provide relevant information for the target cell. Particularly, it shall typically not be carried out during multicast parts of MBSFN subframes, or during LTE TDD uplink subframes. Gain search is mentioned herein for completeness.

Synchronization Signal Power Delay Profile (SS-PDP)

An example synchronization signal-based residual time estimator operation is outlined below and may, for example, be used as the coarse estimator described above. The synchronization signal-based residual time estimator may be configured to:
1. Transform time domain OFDM symbol to frequency domain.
2. Extract resource elements from signals received from the secondary cell for Primary or Secondary Synchronization Signal (P-SSIG or S-SSIG).
3. Derive channel samples by multiplying the extracted resource elements with the complex conjugate of a prior known P-SSIG or S-SSIG sequence.
4. (OPTIONAL) Accumulate channel samples for P-SSIG and S-SSIG coherently.
5. Transform channel samples to time domain by inverse fast Fourier transform (IFFT).
6. (OPTIONAL) Accumulate power delay profiles (PDPs) non-coherently over Rx diversity branches.
7. Estimate the time offset from the actual OFDM symbol position to the assumed OFDM symbol position (which is initially based on symbol positions of the primary cell) by identifying the position of the peak magnitude.
8. Calculate a figure of merit, e.g. a peak-to-average ratio (PAR) for the detected peak.

The capture range for SS-PDP may typically be ±½ OFDM symbol (±33.3 μs) which is sufficient for the current application. This is because the synchronization signal resource elements are contiguous in frequency.

However, at the respective end points of the power delay profile (the extremes) the SS-PDP is based on only half the targeted OFDM symbol and half of an adjacent OFDM symbol (predecessor or successor for the respective end points). This causes inter-symbol interference (ISI) which reduces the overall signal-to-interference-and-noise-ratio (SINR), and results in reduced performance of the time offset estimator.

Moreover, for delays larger than ±½ OFDM symbol, the estimator wraps around (i.e. the actual delay that is outside the capture range of the estimator is erroneously interpreted as a delay within the capture range), which causes the indicated time offset to have opposite sign (and possibly different magnitude) compared to the actual time offset. Wrap-around may also cause inter symbol interference (ISI) due to the estimated symbol position being severely misaligned with the actual symbol position. To disambiguate the sign of the time offset one may derive the SS-PDP also for preceding and succeeding OFDM symbols. At the extremes of the capture range, the SS-PDP of the preceding or the succeeding OFDM symbol may confirm the sign of the estimated time offset. The risk for wrap-around increases with low SINR since the estimate gets noisier. To improve the SINR and, thus, the quality of the estimate, the span used to define the adjacent (preceding and succeeding) OFDM symbols may be taken at positions where they partially overlap the span of the targeted OFDM symbol. If, for example, each of the spans defining the adjacent symbols is overlapping the targeted OFDM symbol by 50%, the resulting SS-PDPs for two out of these three OFDM symbol spans will never be subjected to more than 25% ISI (which happens at ±16.7 μs). To further improve the SINR for different timing offsets between PCell and SCell, more hypotheses regarding the position of the span of adjacent OFDM symbols can be used. The figures of merit resulting from this estimator for the different hypotheses may be used for determining which SS-PDP to extract the time offset from. Additionally, the figure of merit may be used for determining whether the estimate is reliable.

The resolution of the SS-PDP depends on the size of the IFFT and the quality depends on the SINR.

The SS-PDP described above corresponds to circular convolution between the captured time domain OFDM symbol (based on the selected span) and the synchronization signal sequence(s). Alternatively, a power delay profile may be derived via linear correlation in the time domain. Linear correlation in the time domain does not suffer from the ISI, but it has higher complexity than the SS-PDP described herein.

In an alternative estimator, the linear phase component is estimated directly instead of searching for peaks in the PDP, for example, by calculating the phase slope, e.g. by averaging the phase difference between adjacent resource elements.

In a further alternative estimator, the power in a window comprising more than one PDP-value is calculated rather than looking at individual peaks in the PDP, which typically better captures multipath propagation.

In yet another alternative estimator, several detection approaches may be combined (or several detection approaches may be competing with each other), to acquire a more robust estimate independent of the propagation conditions.

Common Reference Signal Power Delay Profile (CRS-PDP)

An example common reference signal-based residual time estimator operation is outlined below and may, for example, be used as the fine estimator described above. The common reference signal-based residual time estimator may be configured to:

1. Transform time domain OFDM symbol to frequency domain.
2. Extract resource elements from signals received from the secondary cell for reference signals (RSIGs) (e.g. from DL Tx port 0, and if present, DL Tx port 1).
3. Derive channel samples by multiplying the extracted resource elements with the complex conjugate of a prior known RSIG sequence.
4. (OPTIONAL) Accumulate channel samples coherently for adjacent OFDM symbols.
5. Transform channel samples to time domain using IFFT.
6. (OPTIONAL) Accumulate PDPs non-coherently for adjacent OFDM symbols.
7. (OPTIONAL) Accumulate PDPs non-coherently over Rx diversity branches.
8. Estimate the time offset from the actual OFDM symbol position to the assumed OFDM symbol position (which is initially based on symbol positions of the primary cell) by transforming the channel samples using IFFT and identifying the position of the peak magnitude.
9. Calculate a figure of merit, e.g. a peak-to-average ratio (PAR) for the detected peak.

The capture range for CRS-PDP is ±1/12 OFDM symbol (±5.56 μs) due to that the RSIGs are transmitted on every $6^{th}$ subcarrier in the concerned OFDM symbols. Any path (corresponding to a timing offset) that is outside this capture range will cause wrap-around of the estimator. Hence, the CRS-PDP can be used only when the assumed timing of the OFDM symbol is accurate enough for the deviation to be within the capture range. Thus, it may typically be used after the SS-PDP based estimator described above has already been applied.

The benefit is that, potentially, there is a large number of RSIGs to use. For example, for a bandwidth (BW) of 20 MHz and 2 DL Tx ports, there are 1600 RSIGs per unicast subframe, to compare with 62 S-SSIGs and 62 P-SSIGs per 5 subframes, as is used by the SS-PDP based estimator. The larger number of references (RSIGs) allows for more accurate estimates than is possible from the SS-PDP based estimator. However, this benefit is highly dependent on the bandwidth. For a SCell with a bandwidth of 1.4 MHz and 2 DL Tx ports, there are only 96 RSIGs per unicast subframe.

In an alternative estimator, the timing offset may be estimated by searching the first path (e.g. the signal path having the smallest offset value) based on a threshold (e.g. a power value that should be exceeded in the PDP for that PDP value to be considered as a signal path), or by calculating the average delay instead of searching the peak.

In a further alternative estimator operation, the linear phase component/value may be estimated directly instead of searching for peaks in the PDP.

CSI Measurements

CSI reporting is described in 3GPP Technical Specification (TS) 36.213 rev 10.9.0, subclause 7.2. The channel state information comprises channel quality indicator (CQI), precoding matrix index (PMI), rank indication (RI) and precoding type indicator (PTI), all of which are derived from reference signals (common reference signals or dedicated CSI reference signals). CSI measurements are mentioned herein for completeness.

Figure 5:
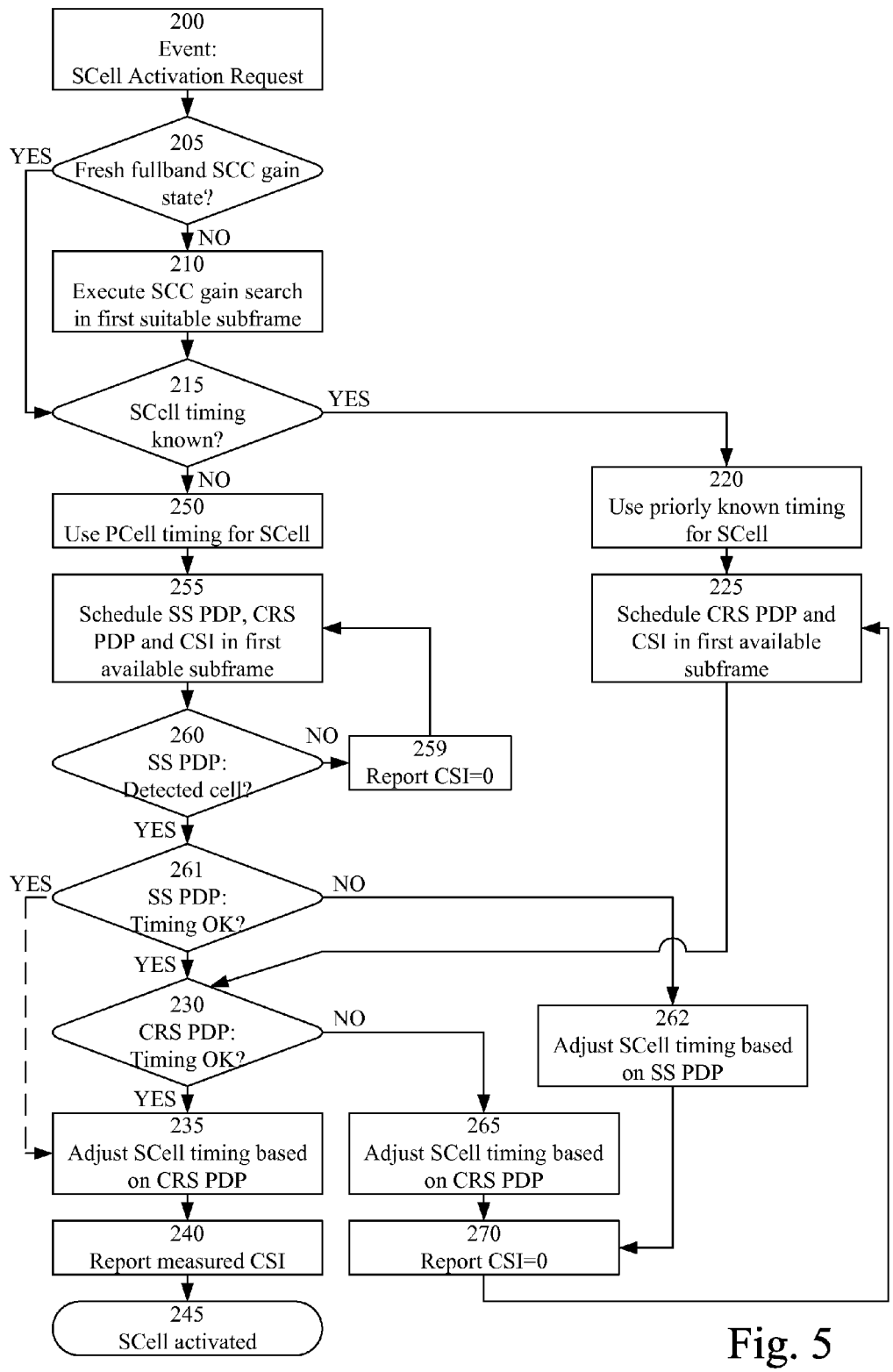
FIG. 5 is a flow chart illustrating an example method for SCell activation according to some embodiments.

FIG. 5 illustrates an example method performed by a UE for SCell activation according to some embodiments.

The method starts in step 200 where a SCell activation request is received from the network node. When the UE receives an activation request (to a known or unknown SCell) in step 200 it is first checked in step 205 whether or not the UE has any reasonably fresh (recent) information about the gain state for the full bandwidth (a fullband SCC gain state having been recently made, e.g. within a specified time period). The gain state may be known e.g. from previous measurement occasion where full bandwidth has been used during reception, or from recent SCell activities on the concerned SCC.

If the gain state is not known (NO-path out of step 205), a gain search in the next suitable subframe is planned for as illustrated by step 210. If the gain state is known (YES-path out of step 205), step 210 is skipped and the method proceeds directly to step 215.

In step 215 it is checked whether or not the timing of the SCell is known (e.g. defined by whether or not the UE has measured and reported that cell recently).

If the timing is unknown (NO-path out of step 215), the UE initially assumes the same timing as for PCell according to step 250 and schedules determination of synchronization signal based time deviation (e.g. SS-PDP), determination of common reference signal based time deviation (CRS-PDP) and CSI measurements in the first available subframe containing synchronization signals (e.g. subframe 0 or 5 in case of FDD, subframe 0 and 5 for TDD S-SSIG and subframe 1 and 6 for TDD P-SSIG) according to step 255, and it is checked in step 260 whether or not synchronization based on SS-PDP has been achieved.

If (NO-path out of step 260) the resulting SS-PDP indicates that synchronization has not been achieved (e.g. if PAR, SINR or some other figure of merit is below a threshold), CSI=0 is sent to the network in step 259 and the previous step (step 255) is repeated.

If (YES-path out of step 260) the resulting SS-PDP indicates that synchronization has been achieved (e.g. if PAR, SINR or some other figure of merit is above a threshold), the method proceeds to step 261.

In step 261, it is checked whether or not the synchronization signal based time deviation (e.g. the time residual extracted based on SS-PDP) is small enough (e.g. if an absolute value of the synchronization signal based time deviation is greater than a synchronization signal based time deviation threshold, thus, the extracted time residual falling below the threshold) to be within the acceptable range with respect to CQI performance (for large timing errors, the already produced CQI estimate may not reflect the true channel quality accurately enough and should typically not be used).

If the time residual is not small enough (NO-path out of step 261), the timing estimation of SCell is adjusted based on the SS-PDP result in step 262, a CSI report indicating a default (or nominal) CSI value (e.g. CSI=0) is sent to the network in step 270, and CRS-PDP and CSI measurements are scheduled in the first available subframe as illustrated by step 225.

If the time residual is small enough (YES-path out of step 261), the method proceeds to step 230 where it is checked again whether or not the common reference signal based time deviation (e.g. the time residual extracted based on CRS-PDP) is small enough (e.g. if an absolute value of the common reference signal based time deviation is greater than a common reference signal based time deviation threshold, thus, the extracted time residual falling below the threshold) for the already produced CQI estimate to be reported. Typically the CRS-PDP estimation may be more accurate than the SS-PDP estimation.

If the time residual is not small enough according to the check in step 230 (NO-path out of step 230), the timing estimation of SCell is adjusted based on the CRS-PDP result in step 265, CSI=0 is sent to the network in step 270, and CRS-PDP and CSI measurements are scheduled in the first available subframe as illustrated by step 225.

If the time residual is small enough according to the check in step 230 (YES-path out of step 230), the timing estimation of SCell is adjusted based on the CRS-PDP result in step 235, and the already produced CQI estimate can be reported immediately as illustrated by step 240.

In some embodiments, it can be deduced already from SS-PDP (in step 261) whether or not the CQI can be reported. In such cases, step 230 may be skipped and the YES-path out of step 261 goes directly to step 235. This may be alternatively to the branch from step 261 to step 230, or there may be three alternative branches out of step 261 (to step 235 if the timing offset is below a first threshold (e.g. a synchronization signal based time deviation acceptance threshold), to step 262 if the timing offset is above a second threshold e.g. the synchronization signal based time deviation threshold) and to step 230 if the timing offset is between the first and second thresholds).

If the SCell timing checked in step 215 is prior known (YES-path out of step 215), this known time reference is used initially as illustrated by step 220. In these cases, any time residual is typically expected to be well within the capture range of CRS-PDP, and the UE schedules CRS-PDP and CSI measurements in the first available (unicast) subframe as illustrated by step 225.

When step 225 has been executed, the method proceeds to step 230 and continues as described above.

After a valid CSI report, i.e. with a CQI value other than the default value (e.g. 0), has been sent to the network as illustrated by step 240, the UE typically immediately starts monitoring PDCCH on SCell, and also for SCell (in case of cross-carrier scheduling via PCell). Moreover transmission of sounding reference signals is typically started (3GPP TS 36.321 rev 10.8.0, subclause 5.13), and SCell activation may be achieved as illustrated by step 245.

Note that due to latencies in the receiver it is typically not possible to estimate a time residual in subframe n and applying it already in the next subframe n+1. The number of subframes before the estimate can be applied is implementation specific. Some examples are illustrated in FIG. 6 for FDD and FIG. 7 for TDD.

Figure 6:
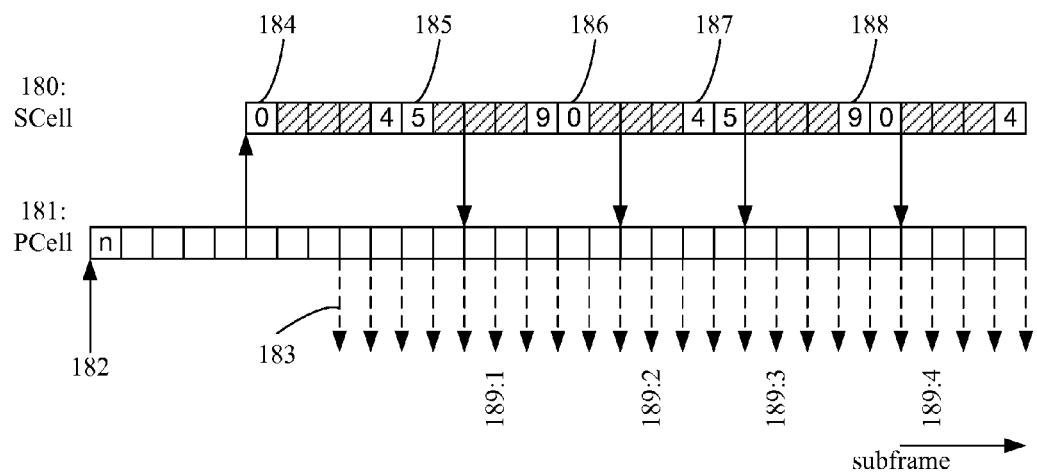
FIG. 6 is a schematic drawing illustrating an example worst case scenario for blind activation in FDD.

FIG. 6 is a schematic drawing illustrating an example worst case scenario for blind activation in FDD.

PCell subframes are illustrated at 181 starting at a subframe n, where a SCell activation request is received as illustrated by 182 (compare with step 200 of FIG. 5). The dashed arrows 183 illustrate CQI reports that should be sent to the network starting at subframe n+8 following the SCell activation request 182.

SCell subframes are illustrated at 180, where subframes with number 0, 4, 5 and 9 are unicast subframes and the other subframes are used for other purposes (e.g. MBSFN). The first available subframe for gain search (compare with step 210 of FIG. 5) is indicated by 184, and the first available subframe for SS-PDP, CRS-PDP and CSI measurements (compare with step 255 of FIG. 5) is indicated by 185 (measurements may be performed in subframe 5 or 0 depending on which of them is most imminent in time).

Hence, in this scenario, a valid CQI report (compare with step 240 of FIG. 5) may be sent at a time indicated by 189:1 at the very earliest (compare with if the checks in steps 260, 261 and 230 of FIG. 5 all follow their respective YES-path), and the earlier CQI reports comprise CSI=0. If a new round of CRS-PDP and CSI measurements is needed (compare e.g. with step 225 of FIG. 5) before a valid CQI report can be sent, CQI reports continue to comprise CSI=0 (compare with step 270 of FIG. 5), and the new round of CRS-PDP and CSI measurements may be scheduled in the subframes indicated by 186, 187 or 188 respectively. Then, a valid CQI report (compare with step 240 of FIG. 5) may be sent at a time indicated by 189:2, 189:3 or 189:4 respectively.

Thus, for FDD the first report with a valid CSI can be sent at 189:1, 189:2, 189:3 or 189:4, depending on how many attempts it takes to synchronize to the cell (1 or 2), and how big the detected residual time is (report directly or first correct timing, repeat CQI estimation, and then report).

Figure 7:
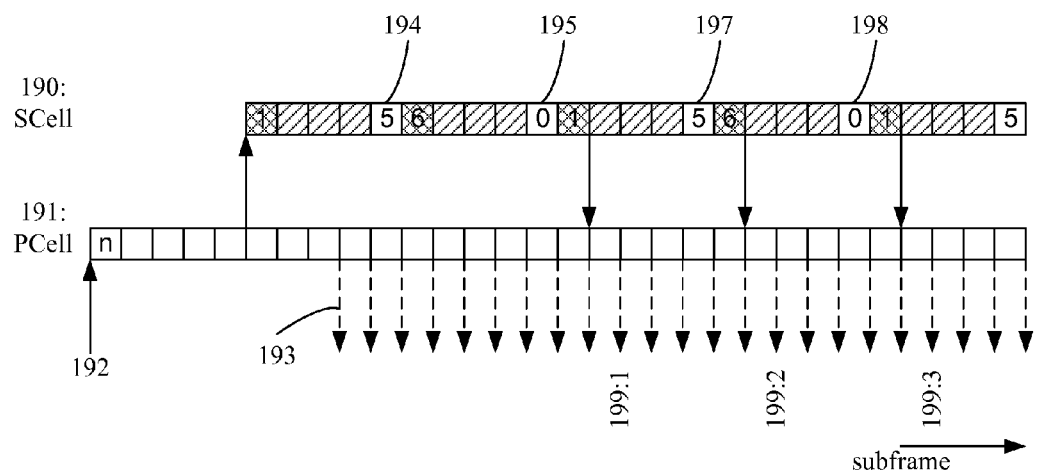
FIG. 7 is a schematic drawing illustrating an example worst case scenario for blind activation in TDD.

FIG. 7 is a schematic drawing illustrating an example worst case scenario for blind activation in TDD.

PCell subframes are illustrated at 191 starting at a subframe n, where a SCell activation request is received as illustrated by 192 (compare with step 200 of FIG. 5). The dashed arrows 193 illustrate CQI reports that should be sent to the network starting at subframe n+8 following the SCell activation request 192.

SCell subframes are illustrated at 190, where subframes with number 0 and 5 are unicast subframes and the other subframes are used for other purposes (e.g. subframes 1 and 6 may be special subframes and the other subframes may be used for MBSFN of UL). The first available subframe for gain search (compare with step 210 of FIG. 5) is indicated by 194 (and possibly SS-PDP measurements), and the first available subframe for SS-PDP, CRS-PDP and CSI measurements (compare with step 255 of FIG. 5) is indicated by 195.

Hence, in this scenario, a valid CQI report (compare with step 240 of FIG. 5) may be sent at a time indicated by 199:1 at the very earliest (compare with if the checks in steps 260, 261 and 230 of FIG. 5 all follow their respective YES-path), and the earlier CQI reports comprise CSI=0. If a new round of CRS-PDP and CSI measurements is needed (compare with step 225 of FIG. 5) before a valid CQI report can be sent, CQI reports continue to comprise CSI=0 (compare with step 270 of FIG. 5), and the new round of CRS-PDP and CSI measurements may be scheduled in the subframes indicated by 197, 198, and so on. Then, a valid CQI report (compare with step 240 of FIG. 5) may be sent at a time indicated by 199:2 or 199:3, respectively.

For TDD it has been assumed in this example that the last part of the subframe planned for gain search can be used, and hence that the S-SSIG that resides at the end of the concerned subframe can be extracted. If this is not the case, SS-PDP will have to be scheduled 5 ms later. The first report with a valid CSI can be sent at 199:1, 199:2 or 199:3 depending on how many attempts it takes to synchronize to the cell (1 or 2), and how big the detected residual time is (report directly or first correct timing, repeat CQI estimation, and then report).

Figure 8:
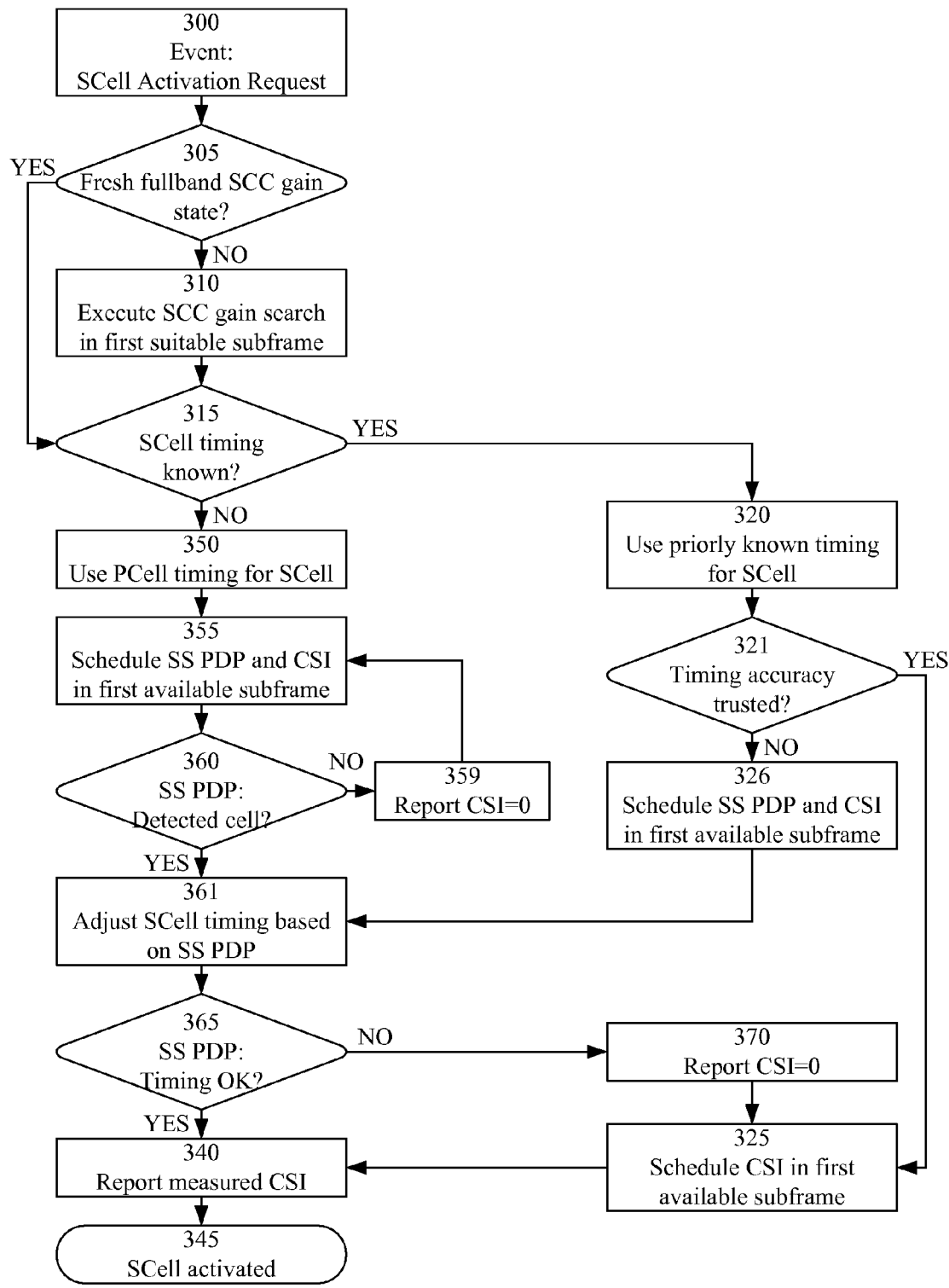
FIG. 8 is a flow chart illustrating an example method for SCell activation using example timing adjustments based on SS-PDP only according to some embodiments.

In some scenarios, it may be beneficial to evaluate whether or not to use common reference signal based time deviation estimation (e.g. CRS-PDP). FIG. 8 illustrates another example method for SCell activation according to some embodiments. This embodiment is similar to the one described in connection to FIG. 5, but relies only on synchronization signal based time reference estimates (e.g. SS-PDP). It may be particularly applicable for small bandwidths (e.g. 6 RBs) since, in such cases, there may be too few CRS to get good quality of CRS-PDP based estimates.

The method starts in step 300 where a SCell activation request is received. When the UE receives an activation request in step 300 it is first checked in step 305 whether or not the UE has any reasonably fresh information about the gain state for the full bandwidth.

If the gain state is not known (NO-path out of step 305), a gain search in the next suitable subframe is planned for as illustrated by step 310. If the gain state is known (YES-path out of step 305), step 310 is skipped and the method proceeds directly to step 315.

In step 315 it is checked whether or not the timing of the SCell is known.

If the timing is unknown (NO-path out of step 315), the UE initially assumes the same timing as for PCell according to step 350 and schedules SS-PDP and CSI measurements in the first suitable subframe according to step 355, and it is checked in step 360 whether or not synchronization based on SS-PDP has been achieved.

If (NO-path out of step 360) the resulting SS-PDP indicates that synchronization has not been achieved, CSI=0 is sent to the network in step 359 and the previous step (step 355) is repeated.

If (YES-path out of step 360) the resulting SS-PDP indicates that synchronization has been achieved, the method proceeds to step 361, where the timing estimation of SCell is adjusted based on the SS-PDP result.

In step 365, it is checked whether or not the time residual extracted based on SS-PDP is small enough (e.g. the extracted time residual falling below a threshold) to be within the acceptable range with respect to CQI performance. If the time residual is small enough (YES-path out of step 365), the method proceeds to step 340 where the already produced CQI estimate can be reported immediately. If the time residual is not small enough (NO-path out of step 365), CSI=0 is sent to the network in step 370, CSI measurements are scheduled in the first available subframe as illustrated by step 325, and only thereafter can a valid CQI report be sent to the network as illustrated by step 340.

If the SCell timing checked in step 315 is prior known (YES-path out of step 315), this known time reference is used initially as illustrated by step 320, and it is determined in step 321 whether or not the timing is accurate enough (compare with step 365). If the timing reference is accurate enough (YES-path out from step 321), CSI measurements are scheduled in the first available subframe as illustrated by step 325 and the method continues thereafter as described above. If the timing reference is not accurate enough (NO-path out from step 321), SS-PDP and CSI measurements are scheduled in the first suitable subframe according to step 326 (compare with step 355) and then the method proceeds to step 361 and continues as described above.

After a valid CSI report, i.e. with CQI other than 0, has been sent to the network as illustrated by step 340, SCell activation may be achieved as illustrated by step 345.

In the following an example of how SS-PDP (compare e.g. with step 255 of FIG. 5 and/or steps 355 and 326 of FIG. 8) may be generated will be given. As mentioned earlier, reducing ISI can improve the SS-PDP and hence result in a more accurate estimate of the time offset. To reduce the ISI, three or more partially overlapping OFDM symbol spans (e.g. ±½ OFDM symbol (±33.3 μs) around the PCell timing) may be used.

Since partially overlapping symbols are typically only used for SS-PDP, and the synchronization signals only occupy the central 72 of the up to 1200 REs, an alternative approach, feasible for implementation at low cost in software, can be used for getting approximations of the overlapped symbols. This approach is exemplified in FIG. 10 in combination with FIG. 9, wherein FIG. 10 is a flow chart illustrating an example method for achieving a SS PDP based on FDD symbol positions and FIG. 9 is a schematic drawing illustrating an example LTE FDD signal arrangement.

Figure 9:
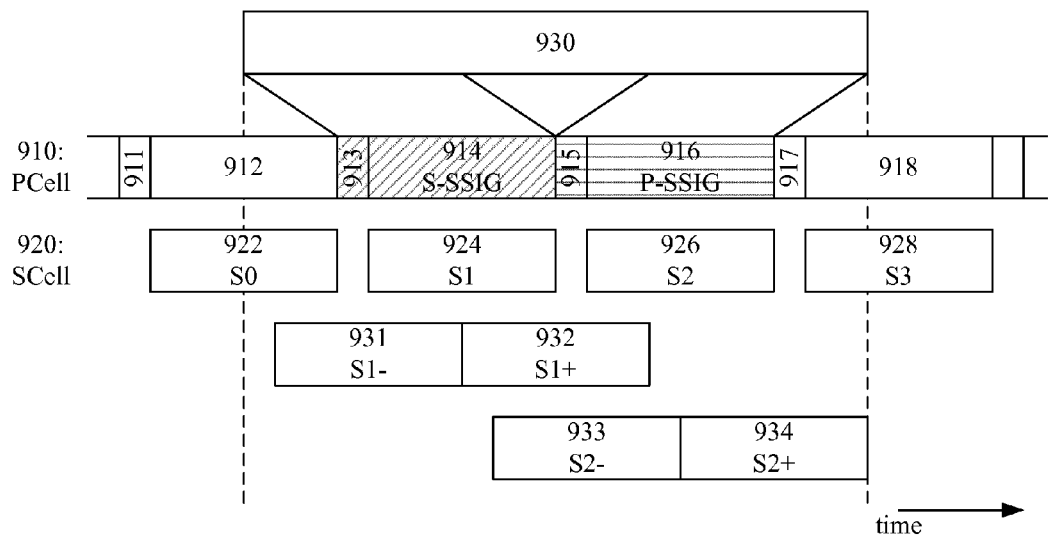
FIG. 9 is a schematic drawing illustrating an example LTE FDD signal arrangement according to some embodiments.
Figure 10:
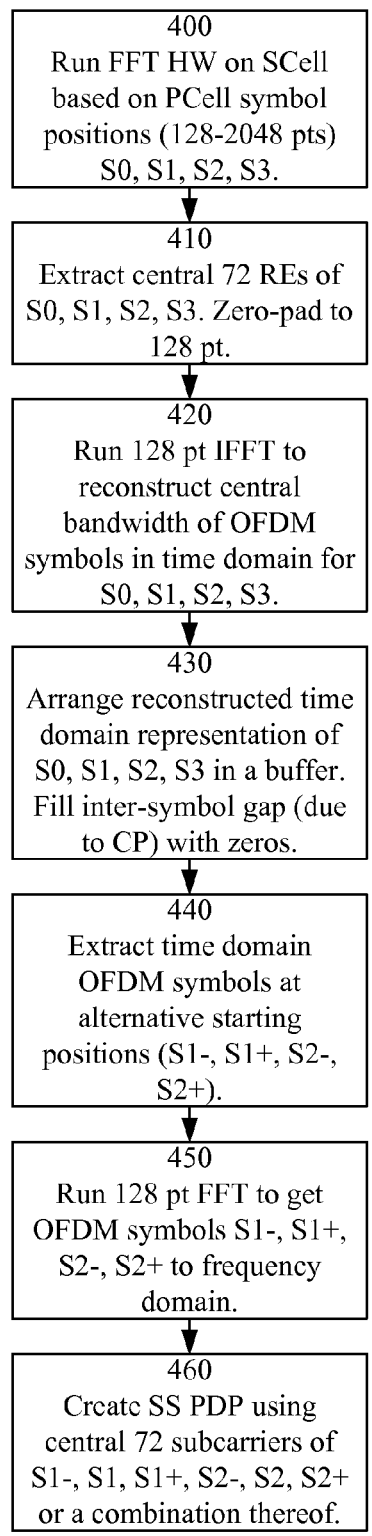
FIG. 10 is a flow chart illustrating an example method for achieving a SS PDP based on FDD symbol positions according to some embodiments.

In FIG. 9, the PCell timing is illustrated at 910 (OFDM symbols 912, 914, 916 and 918 with respective CP 911, 913, 915 and 917, wherein 914 contains S-SSIG and 916 contains P-SSIG) and the assumed SCell timing (i.e. where an SCell FFT hardware may be operated) is illustrated at 920 (OFDM symbol spans S0, S1, S2 and S3 denoted 922, 924, 926 and 928). OFDM symbol spans overlapping the assumed SCell timing with +/−half a symbol (also termed interpolated symbols, e.g. at 1.92 MHz) are shown for S1 (S1− 931 and S1+ 932) and S2 (S2− 933 and S2+ 934), and the potential position for SSIGs in SCell is illustrated by 930. The example approach may be described as follows with reference to FIG. 10:

1. Step 400: Based on signal timing for PCell, use an FFT (e.g. implemented in HW) to transform 3 OFDM symbols S0, S1, S2 (922, 924, 926) for S-SSIG and S1, S2, S3 (924, 926, 928) for P-SSIG to frequency domain.
2. Step 410: For each symbol, extract the 72 central REs, i.e., the bandwidth where the synchronization signals may be found. Zero-pad to get length 128. It should be noted that other lengths may be used as appropriate, e.g. related to the size of the FFT implementation. Using a larger length typically improves resolution but adds complexity. In the example, embodiment described herein a length of 64 could be considered, since that length would be able to cover the central 62 REs. Such a choice might typically result in a coarser resolution and more interference.
3. Step 420: Calculate the inverse FFT to get an approximation of the time domain signal seen over e.g. 1.4 MHz (typically depending on the FFT implementation). Sampling rate will, for example, correspond to 1.92 Msamples/s for a 1.4 MHz cell bandwidth.
4. Step 430: Arrange the time domain OFDM symbols in a vector, with cyclic prefix (CP) replaced by zeros.
5. Step 440: Extract "interpolated" OFDM symbols S1−, S1+, S2− and S2+, (931, 932, 933, 934)
6. Step 450: Subject the extracted "interpolated" symbols to a 128 point FFT.
7. Step 460: Calculate SS-PDP based on S1−, S1, and S1+ for S-SSIG, and S2−, S2, S2+ for P-SSIG.

Producing the SS-PDP may be taken to include transformation to the time domain. Signal combination to produce the SS-PDP may be performed in the frequency domain (coherently, before transforming to the time domain) or in the time domain (non-coherently, after transforming to the time domain). The transformation to and from the frequency domain is enables de-rotation of the resource elements carrying the synchronization signal. Adjustment for phase difference may be needed for some combinations (e.g. S1 and S1+ since their offset relative to the PCell OFDM symbol reference are different) and may not be needed for other combinations (e.g. S1 and S2).

Figure 11:
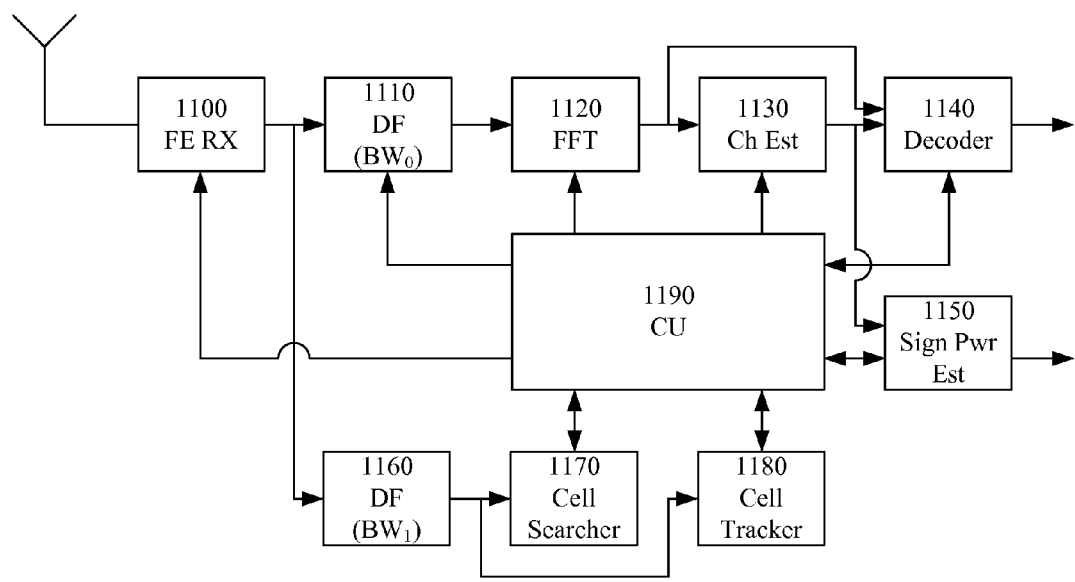
FIG. 11 is a block diagram of an example receiver (only one Rx branch shown) according to some embodiments.

FIG. 11 is a block diagram of an example receiver. The example receiver may be adapted to perform any of the methods described herein, for example, any of the methods of FIGS. 5, 8, 10 and 12.

The example receiver of FIG. 11 comprises a receiver front-end (FE RX) 1100, a digital filter (DF) 1110 of bandwidth $BW_0$, a fast Fourier transform unit (FFT) 1120, a channel estimator (Ch Est) 1130, a decoder 1140, a signal power estimator (Sign Pwr Est) 1150, a cell tracker 1180, a cell searcher 1170, a digital filter (DF) 1160 of bandwidth $BW_1$ and a control unit (CU) 1190. The control unit 1190 may, for example, be adapted to cause the other components to perform execution of steps in the order described in connection to any of FIGS. 5, 8, 10 and 12.

When scheduling SS-PDP, CRS-PDP and CSI measurements simultaneously according to some embodiments, the receiver of FIG. 11 may be open at full downlink system bandwidth ($BW_0$). The received symbols are transformed into frequency domain using an FFT hardware accelerator (1120), typically resulting in N RB times 12 resource elements (REs) per OFDM symbol (since there are 12 resource elements per resource block in the frequency domain, see e.g. 3GPP Technical Specification (TS) 36.211), where N_RB is the downlink system (cell) bandwidth $BW_0$ in terms or resource blocks (e.g. bandwidth equals 6, 15, 25, 50, 75, or 100 resource blocks, see e.g. 3GPP Technical Specification (TS) 36.101). The FFT hardware accelerator 1120 may, for instance, be dimensioned to process one OFDM symbol per OFDM symbol time. If support for processing of partially overlapping OFDM symbols as described in connection to FIG. 9 is desirable, faster processing at the FFT would typically be required. This would have a negative impact on the complexity of the FFT hardware accelerator and/or on the amount of required memory (i.e. increased complexity and/or more memory space required). Therefore, the software based approach of FIG. 10 is beneficial and may avoid the drawbacks with regard to FFT complexity and memory requirements.

Figure 12:
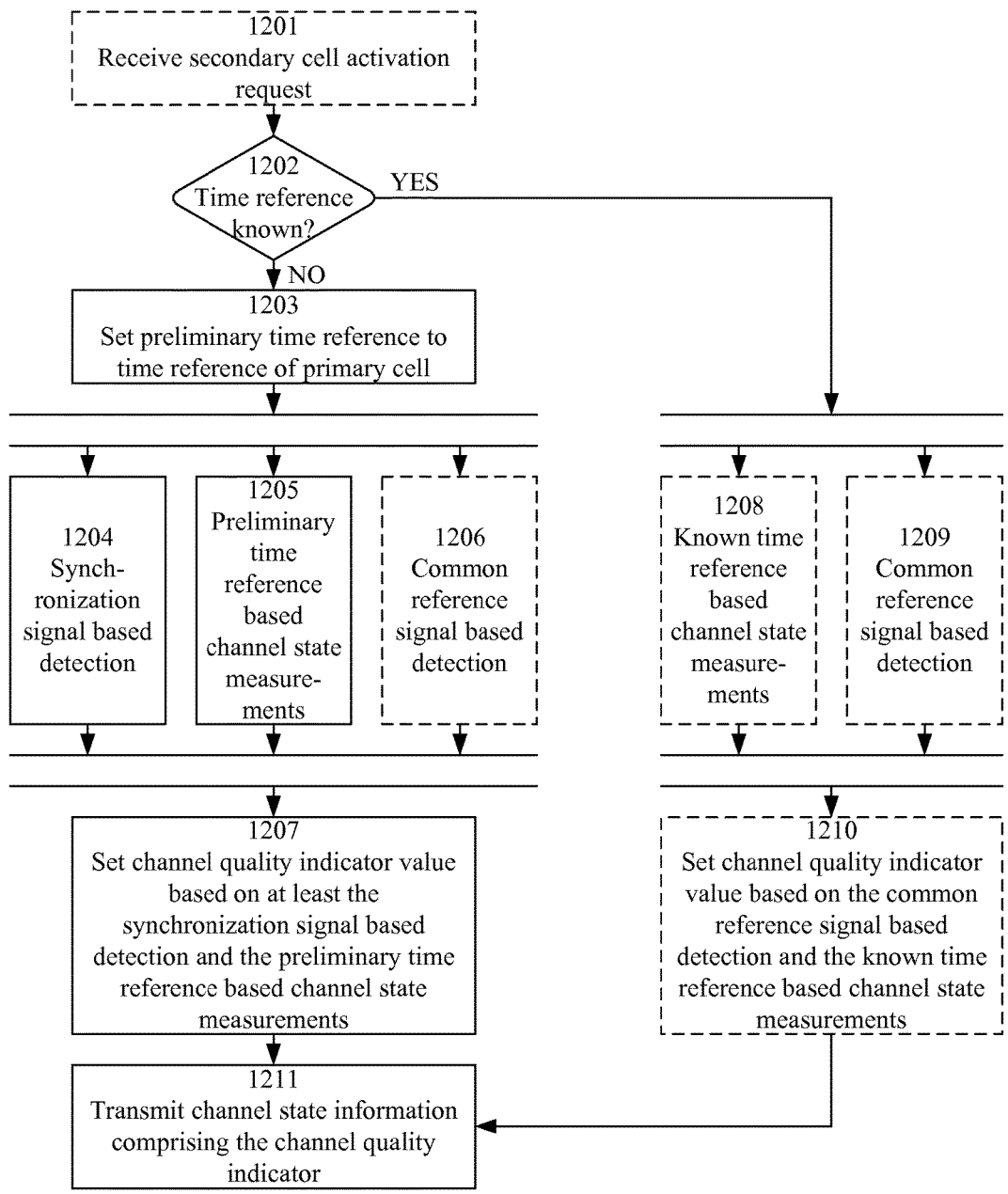
FIG. 12 is a flowchart illustrating example method steps according to some embodiments.

FIG. 12 illustrates an example carrier aggregation application method according to an embodiment of attaining time synchronization to a secondary cell for a wireless communication device usable in a cellular communication network. When a secondary cell activation request has been received (1201, compare with step 200 of FIG. 5 and step 300 of FIG. 8), it is determined whether or not a time reference of the secondary cell is known to the wireless communication device (1202, compare with step 215 of FIG. 5 and step 315 of FIG. 8).

If (1202) the time reference of the secondary cell is un-known to the wireless communication device (NO-path out from step 1202), the time reference of the primary cell is used as a preliminary time reference for the secondary cell (1203, compare with step 250 of FIG. 5 and step 350 of FIG. 8), i.e. the preliminary time reference of the secondary cell is set to equal the time reference of a primary cell of the carrier aggregation application.

Then, synchronization signal based time reference detection (synchronization signal based time deviation determination) of the secondary cell is performed (1204) based on the preliminary time reference and one or more synchronization signals transmitted in the secondary cell, and preliminary time reference based channel state measurements of the secondary cell are performed (1205) based on the preliminary time reference and one or more reference signals transmitted in the secondary cell. For example, steps 1204 and 1205 may be performed in parallel. Optionally, (and possibly in parallel to steps 1204 and/or 1205) common reference signal based time reference detection (common reference signal based time deviation determination) may also be performed (1206), compare with step 255 of FIG. 5 and step 355 of FIG. 8. The value of the channel quality indicator (CQI value) is set based on the result of steps 1204 and 1205 (and optionally 1206) in step 1207 (compare with steps 259, 240, 270 of FIG. 5 and steps 359, 340, 370 of FIG. 8), and the channel state information (CSI) report comprising the channel quality indicator (CQI) is transmitted to the cellular communication network in 1211. For example, the value of the channel quality indicator may be set based on the synchronization signal based detection, a to either a nominal value or a value based on the preliminary time reference based channel state measurements.

If (1202) the time reference of the secondary cell is known to the wireless communication device (YES-path out from step 1202), that time reference is used (compare with step 220 of FIG. 5 and step 320 of FIG. 8). Known time reference based channel state measurements (1208) are performed in parallel to common reference signal based time reference detection (1209), compare with step 225 of FIG. 5 and step 326 of FIG. 8. The common reference signal based time reference detection may be applied if fine tuning of the known time reference is needed. The CQI value is set based on the result of step 1208 (and optionally 1209) in step 1210 (compare with steps 240, 270 of FIG. 5 and steps 340, 370 of FIG. 8), and the CSI report comprising the CQI is transmitted in 1211.

Figure 14:
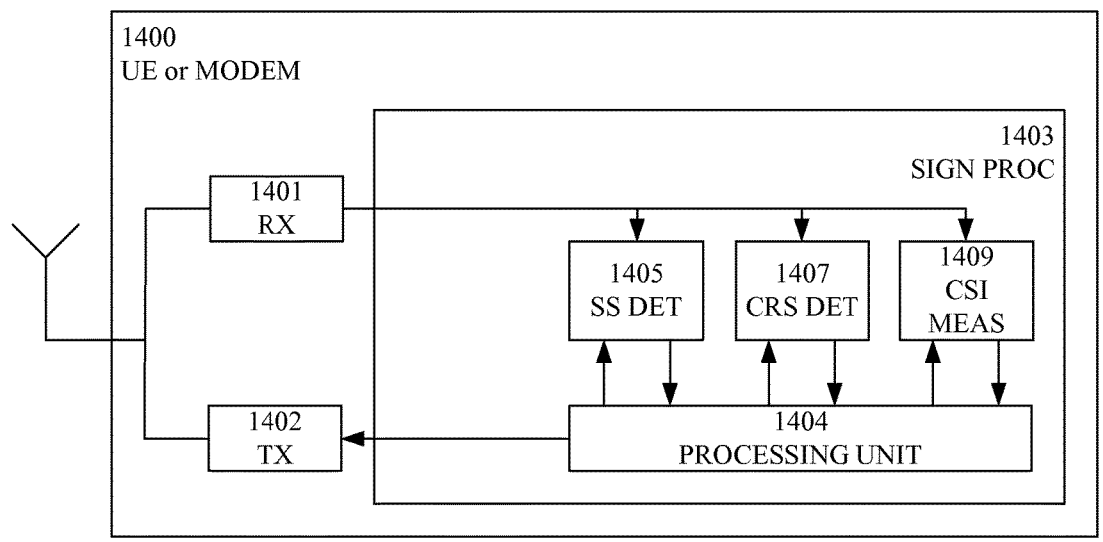
FIG. 14 is a block diagram illustrating an example arrangement according to some embodiments.

FIG. 14 illustrates a schematic wireless communication device (e.g. a modem or a UE) (1400) comprising a receiver RX (1401), a transmitter TX (1402) and a signal processor circuit SIGN PROC (1403). The example signal processor circuit comprises a synchronization signal time reference detector SS DET (1405) (which may in turn comprise one or more fast Fourier transform units or may be otherwise associated with one or more fast Fourier transform units, the one or more fast Fourier transform units being implemented in hardware and/or software), a common reference signal time reference detector CRS DET (1407) (which may in turn comprise a channel estimator or may be otherwise associated with a channel estimator), a channel state information measurement unit CSI MEAS (1409) and a processing unit (1404). The wireless communication device 1400 may be compliant with the Universal Mobile Telecommunication Standard, Long Term Evolution—UMTS-LTE.

The example modem or UE or wireless device of FIGS. 11 and 14 may comprise arrangements adapted to perform the processing described above in relation to FIGS. 5, 8, 9, 10 and 12.

For example, the receiver 1401 of FIG. 14 may be adapted to receive the secondary cell request in accordance with step 1201 of FIG. 12, and the processing unit 1404 may be adapted to perform steps 1202, 1203, 1207 and 1210. The processing unit 1404 may also be adapted to cause the synchronization signal time reference detector 1405 to perform step 1204, to cause the common reference signal time reference detector 1407 to perform steps 1206 and 1209, and to cause the channel state information measurement unit 1409 to perform steps 1205 and 1208. The transmitter 1402 may be adapted to transmit the channel state information in accordance with step 1211.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a UE, a portable or handheld mobile radio communication equipment, a mobile radio terminal, a mobile telephone, a communicator, an electronic organizer, a smartphone, a computer, a notebook, a USB-stick, a plug-in card, an embedded drive, or a mobile gaming device.

Figure 13:
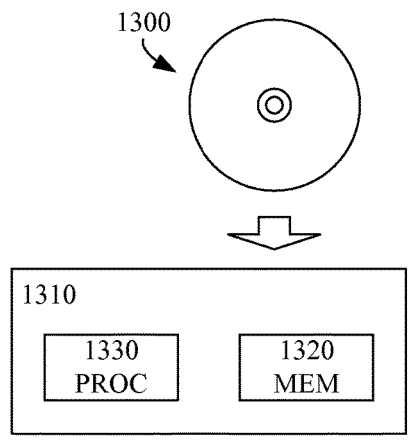
FIG. 13 is a schematic drawing of a computer readable medium according to some embodiments.

According to some embodiments, a computer program product comprises a computer readable medium such as, for example, a diskette or a CD-ROM (1300) as illustrated in FIG. 13. The computer readable medium may have stored thereon a computer program comprising program instructions. The computer program may be loadable into a data-processing unit (1330), which may, for example, be comprised in a mobile terminal (1310). When loaded into the data-processing unit, the computer program may be stored in a memory (1320) associated with or integral to the data-processing unit. According to some embodiments, the computer program may, when loaded into and run by the data-processing unit, cause the data-processing unit to execute method steps according to, for example, the methods shown in any of the FIGS. 5, 8, 10 and/or 12.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A carrier aggregation application method of attaining time synchronization to a secondary cell for a wireless communication device usable in a cellular communication network, the method comprising:

in response to a time reference of the secondary cell being unknown to the wireless communication device:
  setting a preliminary time reference of the secondary cell to equal a time reference of a primary cell of the carrier aggregation application;
  performing a synchronization signal based detection of the time reference of the secondary cell based on the preliminary time reference and one or more synchronization signals transmitted in the secondary cell;
  performing preliminary time reference based channel state measurements of the secondary cell based on the preliminary time reference and one or more reference signals transmitted in the secondary cell;

setting, based on the synchronization signal based detection, a value of a channel quality indicator to either a nominal value or a value based on the preliminary time reference based channel state measurements; and transmitting a channel state information report comprising the channel quality indicator to the cellular communication network.

2. The method of claim 1, wherein the following are performed in parallel:

the performing the synchronization signal based detection of the time reference of the secondary cell based on the preliminary time reference and one or more synchronization signals transmitted in the secondary cell; and the performing preliminary time reference based channel state measurements of the secondary cell based on the preliminary time reference and one or more reference signals transmitted in the secondary cell are performed in parallel.

3. The method of claim 1, wherein the setting the value of the channel quality indicator comprises setting the value of the channel quality indicator to the nominal value when the synchronization signal based detection indicates that the secondary cell is not detected.

4. The method of claim 3, wherein the setting the value of the channel quality indicator further comprises, in response to the synchronization signal based detection indicating that the secondary cell is detected:

determining a synchronization signal based time deviation between the preliminary time reference and the time reference of the synchronization signal based detection; and when an absolute value of the synchronization signal based time deviation is greater than a synchronization signal based time deviation threshold, adjusting the time reference of the secondary cell based on the synchronization signal based time deviation and setting the value of the channel quality indicator to the nominal value.

5. The method of claim 4, further comprising, when the absolute value of the synchronization signal based time deviation is less than the synchronization signal based time deviation threshold:

adjusting the time reference of the secondary cell based on the synchronization signal based time deviation; and setting the value of the channel quality indicator to the value based on the preliminary time reference based channel state measurements.

6. The method of claim 1:

further comprising performing a common reference signal based detection of the time reference of the secondary cell based on the preliminary time reference and one or more common reference signals transmitted in the secondary cell;

wherein the setting the value of the channel quality indicator to either the nominal value or the value based on the preliminary time reference based channel state measurements is further based on the common reference signal based detection.

7. The method of claim 6:

wherein the setting the value of the channel quality indicator further comprises, in response to the synchronization signal based detection indicating that the secondary cell is detected:

determining a synchronization signal based time deviation between the preliminary time reference and the time reference of the synchronization signal based detection; and when an absolute value of the synchronization signal based time deviation is greater than a synchronization signal based time deviation threshold, adjusting the time reference of the secondary cell based on the synchronization signal based time deviation and setting the value of the channel quality indicator to the nominal value;

further comprising, when the absolute value of the synchronization signal based time deviation is less than the synchronization signal based time deviation threshold:

determining a common reference signal based time deviation between the preliminary time reference and the time reference of the common reference signal based detection; and when an absolute value of the common reference signal based time deviation is greater than a common reference signal based time deviation threshold, adjusting the time reference of the secondary cell based on the common reference signal based time deviation and setting the value of the channel quality indicator to the nominal value.

8. The method of claim 7, further comprising, when the absolute value of the common reference signal based time deviation is less than the common reference signal based time deviation threshold, adjusting the time reference of the secondary cell based on the common reference signal based time deviation and setting the value of the channel quality indicator to the value based on the preliminary time reference based channel state measurements.

9. The method of claim 6;

wherein the setting the value of the channel quality indicator further comprises, in response to the synchronization signal based detection indicating that the secondary cell is detected:

determining a synchronization signal based time deviation between the preliminary time reference and the time reference of the synchronization signal based detection; and when an absolute value of the synchronization signal based time deviation is greater than a synchronization signal based time deviation threshold, adjusting the time reference of the secondary cell based on the synchronization signal based time deviation and setting the value of the channel quality indicator to the nominal value;

further comprising, when the absolute value of the synchronization signal based time deviation is less than the synchronization signal based time deviation threshold and greater than a synchronization signal based time deviation acceptance threshold:

determining a common reference signal based time deviation between the preliminary time reference and the time reference of the common reference signal based detection; and when an absolute value of the common reference signal based time deviation is greater than a common reference signal based time deviation threshold, adjusting the time reference of the secondary cell based on the common reference signal based time deviation and setting the value of the channel quality indicator to the nominal value.

10. The method of claim 9, further comprising, when the absolute value of the synchronization signal based time deviation is less than the synchronization signal based time deviation threshold and less than the synchronization signal based time deviation acceptance threshold:
   adjusting the time reference of the secondary cell based on the synchronization signal based time deviation or the common reference signal based time deviation;
   setting the value of the channel quality indicator to the value based on the preliminary time reference based channel state measurements.

11. The method of claim 6, wherein the following are performed in parallel:
   the performing the common reference signal based detection of the time reference of the secondary cell based on the preliminary time reference and one or more common reference signals transmitted in the secondary cell;
   the performing the synchronization signal based detection of the time reference of the secondary cell based on the preliminary time reference and one or more synchronization signals transmitted in the secondary cell.

12. The method of claim 1, further comprising, when the time reference of the secondary cell is known to the wireless communication device:
   performing known time reference based channel state measurements of the secondary cell based on the known time reference and one or more reference signals transmitted in the secondary cell;
   setting the value of the channel quality indicator to either a nominal value or the value based on the known time reference based channel state measurements; and
   transmitting the channel state information report comprising the channel quality indicator to the cellular communication network.

13. The method of claim 1, further comprising initially receiving a secondary cell activation request from the primary cell.

14. The method of claim 6:
   wherein the setting the value of the channel quality indicator comprises setting the value of the channel quality indicator to the nominal value when the synchronization signal based detection indicates that the secondary cell is not detected;
   wherein setting the value of the channel quality indicator further comprises, when the synchronization signal based detection indicates that the secondary cell is detected:
      determining a synchronization signal based time deviation between the preliminary time reference and the time reference of the synchronization signal based detection;
      determining a common reference signal based time deviation between the preliminary time reference and the time reference of the common reference signal based detection;
      determining a difference between the synchronization signal based time deviation and the common reference signal based time deviation;
      when an absolute value of the difference is less than a difference threshold, adjusting the time reference of the secondary cell based on at least one of the synchronization signal based time deviation and the common reference signal based time deviation, and setting the value of the channel quality indicator to the value based on the preliminary time reference based channel state measurements; and
      when the absolute value of the difference is greater than the difference threshold, setting the value of the channel quality indicator to the nominal value.

15. The method of claim 1, wherein performing the synchronization signal based detection of the time reference of the secondary cell comprises creating a power delay profile based on two or more orthogonal frequency division multiplex (OFDM) symbols of the synchronization signals.

16. The method of claim 1, wherein the respective carrier frequency of the primary and secondary cells are:
   non-contiguous and located in a same frequency band; or
   located in different frequency bands.

17. The method of claim 1, wherein the wireless communication device and the cellular communication network are compliant with the Universal Mobile Telecommunication Standard, Long Term Evolution (UMTS-LTE).

18. The method of claim 1, wherein the performing a synchronization signal based detection of the time reference of the secondary cell based on the preliminary time reference and one or more synchronization signals transmitted in the secondary cell comprises:
   performing a fast Fourier transform of the one or more synchronization signals transmitted in the secondary cell based on the preliminary time reference to produce a transformed signal;
   extracting a relevant part of the transformed signal;
   appending zero-valued signal elements to the extracted part to produce a zero-padded transformed signal part;
   performing an inverse fast Fourier transform of the zero-padded transformed signal part to produce a reconstructed signal;
   performing one or more fast Fourier transforms of the reconstructed signal based on one or more respective alternative time references to produce respective one or more transformed signal alternatives;
   creating a power delay profile based on the reconstructed signal and the one or more transformed signal alternatives; and
   detecting the time reference of the secondary cell based on the created power delay profile.

19. A non-transitory computer readable medium for facilitating a carrier aggregation application method in attaining time synchronization to a secondary cell for a wireless communication device usable in a cellular communication network, the non-transitory computer readable medium having stored thereon software instructions which, when run on a data processing circuit, causes the data processing circuit to:
   in response to a time reference of the secondary cell being unknown to the wireless communication device:
   set a preliminary time reference of the secondary cell to equal a time reference of a primary cell of the carrier aggregation application;
   perform a synchronization signal based detection of the time reference of the secondary cell based on the preliminary time reference and one or more synchronization signals transmitted in the secondary cell;
   perform preliminary time reference based channel state measurements of the secondary cell based on the preliminary time reference and one or more reference signals transmitted in the secondary cell;
   set, based on the synchronization signal based detection, a value of a channel quality indicator to either a nominal value or a value based on the preliminary time reference based channel state measurements; and
   transmit a channel state information report comprising the channel quality indicator to the cellular communication network.

20. An arrangement for a wireless communication device usable in a cellular communication network, configured to attain time synchronization to a secondary cell of a carrier aggregation application, the arrangement comprising:
- a receiver configured to receive one or more synchronization signals transmitted in the secondary cell and one or more reference signals transmitted in the secondary cell;
- a signal processor circuit configured to, when a time reference of the secondary cell is unknown to the wireless communication device:
  - set a preliminary time reference of the secondary cell to equal a time reference of a primary cell of the carrier aggregation application;
  - perform a synchronization signal based detection of the time reference of the secondary cell based on the preliminary time reference and one or more synchronization signals transmitted in the secondary cell;
  - perform preliminary time reference based channel state measurements of the secondary cell based on the preliminary time reference and one or more reference signals transmitted in the secondary cell; and
  - set, based on the synchronization signal based detection, a value of a channel quality indicator to either a nominal value or a value based on the preliminary time reference based channel state measurements; and
- a transmitter configured to transmit a channel state information report comprising the channel quality indicator to the cellular communication network.

21. The arrangement of claim 20, wherein the signal processor circuit is configured to set the value of the channel quality indicator to the nominal value when the synchronization signal based detection indicates that the secondary cell is not detected.

22. The arrangement of claim 21, wherein the signal processor circuit is configured to, when the synchronization signal based detection indicates that the secondary cell is detected:
- determine a synchronization signal based time deviation between the preliminary time reference and the time reference of the synchronization signal based detection; and
- when an absolute value of the synchronization signal based time deviation is greater than a synchronization signal based time deviation threshold, adjust the time reference of the secondary cell based on the synchronization signal based time deviation and set the value of the channel quality indicator to the nominal value.

23. The arrangement of claim 22, wherein the signal processor circuit is further configured to, when the absolute value of the synchronization signal based time deviation is less than the synchronization signal based time deviation threshold:
- adjust the time reference of the secondary cell based on the synchronization signal based time deviation; and
- set the value of the channel quality indicator to the value based on the preliminary time reference based channel state measurements.

24. The arrangement of claim 20, wherein the signal processor circuit is further configured to:
- perform a common reference signal based detection of the time reference of the secondary cell based on the preliminary time reference and one or more common reference signals transmitted in the secondary cell; and
- base setting of the value of the channel quality indicator to either the nominal value or the value based on the preliminary time reference based channel state measurements on the common reference signal based detection.

25. The arrangement of claim 24:
wherein the signal processor circuit is configured to, when the synchronization signal based detection indicates that the secondary cell is detected:
- determine a synchronization signal based time deviation between the preliminary time reference and the time reference of the synchronization signal based detection; and
- when an absolute value of the synchronization signal based time deviation is greater than a synchronization signal based time deviation threshold, adjust the time reference of the secondary cell based on the synchronization signal based time deviation and set the value of the channel quality indicator to the nominal value;

wherein the signal processor circuit is further configured to, when the absolute value of the synchronization signal based time deviation is less than the synchronization signal based time deviation threshold:
- determine a common reference signal based time deviation between the preliminary time reference and the time reference of the common reference signal based detection; and
- when an absolute value of the common reference signal based time deviation is greater than a common reference signal based time deviation threshold, adjust the time reference of the secondary cell based on the common reference signal based time deviation and set the value of the channel quality indicator to the nominal value.

26. The arrangement of claim 25, wherein the signal processor circuit is further configured to, when the absolute value of the common reference signal based time deviation is less than the common reference signal based time deviation threshold:
- adjust the time reference of the secondary cell based on the common reference signal based time deviation; and
- set the value of the channel quality indicator to the value based on the preliminary time reference based channel state measurements.

27. The arrangement of claim 24:
wherein the signal processor circuit is configured to, when the synchronization signal based detection indicates that the secondary cell is detected:
- determine a synchronization signal based time deviation between the preliminary time reference and the time reference of the synchronization signal based detection; and
- when an absolute value of the synchronization signal based time deviation is greater than a synchronization signal based time deviation threshold, adjust the time reference of the secondary cell based on the synchronization signal based time deviation and set the value of the channel quality indicator to the nominal value;

wherein the signal processor circuit is further configured to, when the absolute value of the synchronization signal based time deviation is less than the synchronization signal based time deviation threshold and greater than a synchronization signal based time deviation acceptance threshold:
  determine a common reference signal based time deviation between the preliminary time reference and the time reference of the common reference signal based detection; and
  when an absolute value of the common reference signal based time deviation is greater than a common reference signal based time deviation threshold, adjust the time reference of the secondary cell based on the common reference signal based time deviation and set the value of the channel quality indicator to the nominal value.

28. The arrangement of claim 27, wherein the signal processor circuit is further configured to, when the absolute value of the synchronization signal based time deviation is less than the synchronization signal based time deviation threshold and less than the synchronization signal based time deviation acceptance threshold:
  adjust the time reference of the secondary cell based on the synchronization signal based time deviation or the common reference signal based time deviation; and
  set the value of the channel quality indicator to the value based on the preliminary time reference based channel state measurements.

29. The arrangement of claim 20, wherein the signal processor circuit is further configured to, when the time reference of the secondary cell is known to the wireless communication device:
  perform known time reference based channel state measurements of the secondary cell based on the known time reference and one or more reference signals transmitted in the secondary cell; and
  set the value of the channel quality indicator to either a nominal value or the value based on the known time reference based channel state measurements.

30. The arrangement of claim 20:
  wherein the receiver is further configured to receive a secondary cell activation request from the primary cell;
  wherein the signal processor circuit is configured to, in response to the secondary cell activation request being received by the receiver:
    perform the setting the preliminary time reference;
    perform the synchronization signal based detection of the time reference;
    perform the preliminary time reference based channel state measurements;
    perform the setting the value of the channel quality indicator.

31. A modem configured to attain time synchronization to a secondary cell of a carrier aggregation application in a cellular communication network, comprising:
  an arrangement comprising:
    a receiver configured to receive one or more synchronization signals transmitted in the secondary cell and one or more reference signals transmitted in the secondary cell;
    a signal processor circuit configured to, when a time reference of the secondary cell is unknown to the wireless communication device:
      set a preliminary time reference of the secondary cell to equal a time reference of a primary cell of the carrier aggregation application;
      perform a synchronization signal based detection of the time reference of the secondary cell based on the preliminary time reference and one or more synchronization signals transmitted in the secondary cell;
      perform preliminary time reference based channel state measurements of the secondary cell based on the preliminary time reference and one or more reference signals transmitted in the secondary cell; and
      set, based on the synchronization signal based detection, a value of a channel quality indicator to either a nominal value or a value based on the preliminary time reference based channel state measurements; and
    a transmitter configured to transmit a channel state information report comprising the channel quality indicator to the cellular communication network.

32. A wireless communications device configured to attain time synchronization to a secondary cell of a carrier aggregation application in a cellular communication network, comprising:
  an arrangement comprising:
    a receiver configured to receive one or more synchronization signals transmitted in the secondary cell and one or more reference signals transmitted in the secondary cell;
    a signal processor circuit configured to, when a time reference of the secondary cell is unknown to the wireless communication device:
      set a preliminary time reference of the secondary cell to equal a time reference of a primary cell of the carrier aggregation application;
      perform a synchronization signal based detection of the time reference of the secondary cell based on the preliminary time reference and one or more synchronization signals transmitted in the secondary cell;
      perform preliminary time reference based channel state measurements of the secondary cell based on the preliminary time reference and one or more reference signals transmitted in the secondary cell; and
      set, based on the synchronization signal based detection, a value of a channel quality indicator to either a nominal value or a value based on the preliminary time reference based channel state measurements; and
    a transmitter configured to transmit a channel state information report comprising the channel quality indicator to the cellular communication network.

33. The wireless communications device of claim 32:
  further comprising a modem;
  wherein the arrangement comprises a portion of the modem.

34. The wireless communication device of claim 32, wherein the wireless communication device is compliant with the Universal Mobile Telecommunication Standard, Long Term Evolution (UMTS-LTE).

* * * * *